United States Patent
Puente Pestaña et al.

(10) Patent No.: US 12,238,007 B2
(45) Date of Patent: Feb. 25, 2025

(54) ESTABLISHING A PACKET FORWARDING CONTROL PROTOCOL SESSION

(71) Applicant: Telefonaktiebolaget LM Ericsson (publ), Stockholm (SE)

(72) Inventors: Miguel Angel Puente Pestaña, Madrid (ES); Rodrigo Alvarez Dominguez, Madrid (ES); Julian Espinosa Santos, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 541 days.

(21) Appl. No.: 17/621,865

(22) PCT Filed: Sep. 26, 2019

(86) PCT No.: PCT/EP2019/076096
§ 371 (c)(1),
(2) Date: Dec. 22, 2021

(87) PCT Pub. No.: WO2021/001051
PCT Pub. Date: Jan. 7, 2021

(65) Prior Publication Data
US 2022/0247688 A1 Aug. 4, 2022

(30) Foreign Application Priority Data
Jul. 3, 2019 (EP) .................................... 19380013

(51) Int. Cl.
*H04L 47/125* (2022.01)
*H04L 45/0377* (2022.01)

(52) U.S. Cl.
CPC ........ *H04L 47/125* (2013.01); *H04L 45/0377* (2022.05)

(58) Field of Classification Search
CPC . H04L 47/125; H04L 45/0377; H04L 67/141; H04L 45/306; H04L 45/64
See application file for complete search history.

(56) References Cited

U.S. PATENT DOCUMENTS

2015/0333930 A1* 11/2015 Aysola .................... H04L 45/74
370/392
2022/0294855 A1* 9/2022 Landais ................ H04L 67/142

FOREIGN PATENT DOCUMENTS

WO    WO-2017037193 A1 *  3/2017    ........... H04L 45/306

OTHER PUBLICATIONS

3GPP, "3GPP TS 29.244 V16.0.0", 3rd Generation Partnership Project; Technical Specification Group Core Network and Terminals; Interface between the Control Plane and the User Plane Nodes; Stage 3 (Release 16), Jun. 2019, 1-217.

(Continued)

*Primary Examiner* — Nizam U Ahmed
(74) *Attorney, Agent, or Firm* — Weisberg I.P. Law, P.A.

(57) ABSTRACT

There is provided a method performed by a session management function (SMF) node of a network for establishing a PFCP session. A plurality of service functions (SFs) are selected (102) to connect in a service function chain for handling the PFCP session. Each of the plurality of SFs is capable of activating a feature of the PFCP session and is supported by a user plane function (UPF) node. The selection is based on a load of each of the plurality of SFs. For each UPF node that supports one or more of the selected plurality of SFs, transmission of a request is initiated (104) to the UPF node to establish the PFCP session with the UPF node. The request comprises an indication of the one or more of the selected plurality of SFs that the UPF node supports.

12 Claims, 18 Drawing Sheets

(56) References Cited

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Ge, Chang, et al., "Context-Aware Service Chaining Framework for Over-the-Top Applications in 5G Networks", The First International Workshop on Intelligent Cloud Computing and Networking (ICCN 2019), IEEE, 2019, 1-6.

Halpern, J., et al., "Service Function Chaining (SFC) Architecture", Internet Engineering Task Force (IETF), RFC 7665, Oct. 2015, 1-32.

\* cited by examiner

ESTABLISHING A PACKET FORWARDING CONTROL PROTOCOL SESSION

TECHNICAL FIELD

The disclosure relates to methods for establishing a packet forwarding control protocol (PFCP) session and nodes configured to operate in accordance with the methods.

BACKGROUND

FIG. 1 illustrates a third generation partnership project (3GPP) network architecture for the fifth generation (5G) of wireless mobile telecommunications technology.

The 5G network architecture of FIG. 1 comprises a network slice selection function (NSSF), a network exposure function (NEF), a network repository function (NRF), a policy control function (PCF), a unified data management (UDM), and an application function (AF), each having a reference point, namely Nnssf, Nnef, Nnrf, Npcf, Nudm, and Naf respectively. Herein, a reference point may also be referred to as an interface. The 5G network architecture of FIG. 1 also comprises an authentication server function (AUSF), an access and mobility management function (AMF), and a session management function (SMF), each having a reference point, namely Nausf, Namf, and Nsmf.

The 5G network architecture of FIG. 1 further comprises at least one user equipment (UE), an access network (AN) such as a radio access network (RAN), a user plane function (UPF), and a distributed unit (DN). There is a reference point N1 between the AMF and the at least one UE, a reference point N2 between the AMF and the (R)AN, a reference point N3 between the (R)AN and the UPF, a reference point N4 between the SMF and the UPF, a reference point N6 between the UPF and the DN, and a reference point N9 between two UPFs.

FIG. 2 illustrates a third generation partnership project (3GPP) network architecture for a 5G core network (5GC). The 5GC network architecture of FIG. 2 is for policy, charging and analytics.

The 5GC network architecture of FIG. 2 comprises a user data repository (UDR), an NEF, a network data analytics function (NWDAF), an AF, a PCF, and a charging function (CHF), each having a reference point, namely Nudr, Nnef, Nnwdaf, Naf, Npcf, and Nchf respectively. The 5GC network architecture of FIG. 2 also comprises an AMF and an SMF, each having a reference point, namely Namf and Nsmf respectively. The 5GC network architecture of FIG. 2 further comprises a UPF. There is a reference point N4 between the SMF and the UPF.

Herein, the relevant architectural aspects include a control and user plane separation (CUPS) between the SMF and UPF, the PCF, the UDR, and the NWDAF.

The CUPS enables a flexible placement of separated control plane and user plane functions for supporting diverse deployment scenarios (e.g. central or distributed user plane function). In 5G, CUPS refers to network functions of the SMF and UPF and also to the N4 reference point between them, which is based on a Packet Forwarding Control Protocol (PFCP). The SMF controls the packet processing in the UPF by establishing, modifying, or deleting PFCP session contexts and provisioning (i.e. adding, modifying, or deleting) packet detection rules (PDRs), forwarding action rules (FARs), quality of service (QoS) enforcement rules (QERs), usage reporting rules (URRs) and/or buffering action rules (BARs) per PFCP session context, whereby a PFCP session context may correspond to an individual protocol data unit (PDU) session or a standalone PFCP session not tied to any PDU session.

Each PDR contains a PDI (i.e. one or more match fields against which incoming packets are matched) and may be associated to the following rules providing the set of instructions to apply to packets matching the PDI:
  One FAR, which contains instructions related to the processing of the packets, specifically forward, duplicate, drop or buffer the packet with or without notifying the control plane (CP) function about the arrival of a downlink (DL) packet. Each FAR includes what forwarding policies to follow when it comes to N6 traffic steering, e.g. what service chain (sequence of service functions) is to be applied to the packets.
  Zero, one or more QERs, which contain instructions related to the QoS enforcement of the traffic.
  Zero, one or more URRs, which contain instructions related to traffic measurement and reporting.

In CUPS, the UPF reports to the SMF the capabilities it supports. The current standardized capabilities are the following:

| Feature Octet/Bit | Feature | Interface | Description |
| --- | --- | --- | --- |
| 5/1 | BUCP | Sxa | Downlink data buffering in CP function is supported by the user plane (UP) function. |
| 5/2 | DDND | Sxa | The buffering parameter 'Downlink Data Notification Delay' is supported by the UP function. |
| 5/3 | DLBD | Sxa | The buffering parameter 'DL Buffering Duration' is supported by the UP function. |
| 5/4 | TRST | Sxb, Sxc | Traffic Steering is supported by the UP function. |
| 5/5 | FTUP | Sxa, Sxb | Fully qualified tunnel endpoint identifier (F-TEID) allocation/release in the UP function is supported by the UP function. |
| 5/6 | PFDM | Sxb, Sxc | The PFD Management procedure is supported by the UP function. |
| 5/7 | HEEU | Sxb, Sxc | Header enrichment of uplink traffic is supported by the UP function. |
| 5/8 | TREU | Sxb, Sxc | Traffic redirection enforcement in the UP function is supported by the UP function. |
| 6/1 | EMPU | Sxa, Sxb | Sending of end marker packets supported by the UP function. |
| 6/2 | PDIU | Sxa, Sxb, Sxc, N4 | Support of PDI optimised signalling in UP function. |

Service function chaining (SFC) is a capability that creates a service chain of connected service functions (SFs) (such as layers 4 to 7 (L4-7) e.g. firewalls, network address translation (NAT), intrusion protection, QoS, etc.) and connects them in a virtual chain. This capability can be used by network operators to set up suites or catalogs of connected services that enable the use of a single network connection for many services, with different characteristics. SFC is standardized by the Internet Engineering Task Force (IETF).

FIG. 3 illustrates a reference architecture for SFC (RFC 7665). In 3GPP networks, service chains are part of the user plane (UP). The SFs and the SF forwarder (SFF) can be deployed in the N6 interface (so called N6-LAN) or within the UPF. The service chains are identified by an identifier (namely a "Chain-ID") that is sent from the PCF to the SMF on a per user basis (in the PCC rules). Then, in the UPF, the SMF configures the PDRs and FARs. The Chain-ID is included in the FAR.

FIG. 4 illustrates an example architecture for a 3GPP 5G network in this respect. The traffic steering policy ID is preconfigured in the PCF on a per user basis. SMF translates the traffic steering policy ID to the UPF routing configuration. SMF sends to the AMF a PDR and a FAR. When it comes to service chaining, the SMF includes the Chain-ID in the FAR. The UPF includes the Chain-ID in the traffic that is passed to the SF forwarder, e.g. in the network service header (NSH). The SF forwarder has preconfigured the mapping between the Chain-ID and the ordered set of SFs (SF1, SF2, SF3) of the chain.

FIG. 5 illustrates an example 3GPP 5G network architecture for routing traffic.

The 5G network architecture of FIG. 5 comprises an AMF, SMF, a plurality of UPFs (namely a first UPF, a second UPF and a third UPF), a plurality of DNs, at least one UE and an AN (such as a RAN). The 5G network architecture of FIG. 5 also comprises a reference point N1 between the AMF and the at least one UE, a reference point N2 between the AMF and the AN, a reference point N3 between the AN and the first UPF, a reference point N4 between the SMF and each of the plurality of UPFs, a reference point N6 between each of the second and third UPFs and their respective DNs, a reference point N9 between the first UPF and each of the second and third UPFs, and a reference point N11 between the AMF and SMF. The first UPF supports an uplink classifier (UL CL).

In the case of traffic routing towards a local data network (e.g. in edge computing scenarios), the SMF may decide to insert in the data path of a PDU session a classifier UL CL. In the illustrated example of FIG. 5, the UL CL is in a UPF that aims to divert (locally) some traffic matching traffic filters provided by the SMF. The insertion and removal of the UL CL is decided by the SMF (the UPF selection procedures) and controlled by the SMF using generic N4 and UPF capabilities. The SMF may decide to insert in the data path of a PDU session the UPF supporting the UL CL functionality during or after the PDU session establishment, or to remove from the data path of a PDU session the UPF supporting the UL CL functionality after the PDU session establishment. The SMF may include more than one UPF supporting the UL CL functionality in the data path of a PDU Session. The UPFs that provide access to the DNs can be referred to as PDU session anchor (PSA) UPFs.

FIG. 6 illustrates an example 3GPP 5G network architecture that comprises distributed UPFs, namely UPF1, UPF2, UPF3. 3GPP 5G network architecture supports distributed UPFs that can be deployed in separated infrastructures, e.g. in a central location, in the network edge (close to the RAN) or in an edge cloud. In turn, each UFP can support different capabilities (e.g. can allocate different SFs types). In this illustrated example, UPF1 supports three service functions SF1, SF2, SF3, UPF2 supports two service functions SF1, SF2, and UPF3 supports one service function SF3. UPF1 is part of a PDU session anchor (PSA) at a central location, UPF2 is part of a UL CL at an edge location, and UPF3 is part of a PSA at the edge location. The network architecture of FIG. 6 also comprises a RAN.

There are many problems associated with current service chaining techniques when it comes to distributed UPFs such as that illustrated in FIG. 6. In particular, the current service chaining techniques require that the SF chain is activated in a single UPF, since the Chain-ID is configured in the PCF on a per user basis and it reaches the UPF that executes the SF chain. This is problematic in distributed UPF deployments because different SFs may be needed in different UPFs. For example, a UPF in an edge cloud (such as UPF3 in FIG. 6) may require different security, charging, or QoS functionalities than the central UPFs (such as UPF1 in FIG. 6). Also, for example, UPFs in the edge (such as UPF2 in FIG. 6) need to be lighter and minimize the processed load, so it is beneficial to execute the SFs in the central UPFs (e.g. in UPF1 of FIG. 6) in the path. However, some SFs need to be executed in the edge UPFs (e.g. aggregated enforcements), since they are the UPFs that aggregate and steer the traffic of the PDU sessions towards other UPFs. Moreover, the Chain-ID is preconfigured in the PCF and the mapping between the Chain-ID and the SFs are preconfigured in the UPF, which is not flexible. As such, it is not possible to define flexible SF chains dynamically.

Also, in order to select the UPFs for a certain user, the SMF considers the UPF capacity and the overall UPF load. This is problematic since, although the UPF can be unloaded, some SFs can be overloaded, which can cause QoS degradation. Moreover, even a UPF can have an overall large capacity, while some of its SFs can have little capacity. In the same way, for UPF reselection, the SMF considers the overall load and capacity of the UPF, which may lead to inefficient UPF selection triggering and decisions. Internally in the UPFs, load balancing among SF instances is carried out. However, even this is problematic since all the SF instances of a certain SF type in a UPF can be overloaded, and there is no existing mechanism to dynamically select another UPF with less loaded SFs. Also, when there is an SF failure that makes a certain chain unusable, there is no mechanism to handle this problem.

There is thus a need for an improved technique, which is aimed at addressing at least some of the problems associated with existing algorithms.

SUMMARY

It is an object to obviate or eliminate at least some of the above-described disadvantages associated with existing techniques and provide an improved technique for establishing a packet forwarding control protocol (PFCP) session.

Therefore, according to an aspect, there is provided a method performed by a session management function node of a network for establishing a packet forwarding control protocol session. The method comprises selecting a plurality of service functions to connect in a service function chain for handling the packet forwarding control protocol session. Each of the plurality of service functions is capable of activating a feature of the packet forwarding control protocol session and is supported by a user plane function node. The selection is based on a load of each of the plurality of service functions. The method also comprises, for each user plane function node that supports one or more of the selected plurality of service functions, initiating transmission of a request to the user plane function node to establish the packet forwarding control protocol session with the user plane function node. The request comprises an indication of the one or more of the selected plurality of service functions that the user plane function node supports.

There is thus provided an improved method for establishing a packet forwarding control protocol session. In particular, the method considers the load of the individual service functions that are needed to activate the features of the packet forwarding control protocol session. The service functions can be selected based on knowing which service functions are needed, which user plane functions host those service functions and the load of those service functions. In this way, coordinated service chains can be configured across separate user plane functions. It is therefore possible to configure coordinated service function chains among distributed user plane functions.

In some embodiments, the method may comprise selecting the plurality of service functions in response to a determination that a plurality of user plane function nodes are required for handling the packet forwarding control protocol session.

In some embodiments, the selection may be based on a location of each user plane function node that supports one or more of the plurality of service functions. In some embodiments, each of the selected plurality of service functions may be supported by a user plane function node that is located at a predefined location. In this way, different service functions supported by different user plane functions can be allocated, e.g. for a certain user and packet forwarding control protocol session. For example, analytics-related service functionality can be located in distributed (or local) data centers, while generic functionalities (e.g. firewalling) can be located in central data centers. For a certain user, both of these functionalities can be leveraged. The selection supports both local and distributed user plane functions.

In some embodiments, the method may comprise, for each user plane function node that supports one or more of the selected plurality of service functions, receiving an identifier that identifies one or more of the selected plurality of service functions that the user plane function node supports. Thus, an identifier is used to identify the one or more selected plurality of service functions, which means that it is not necessary to specify specific service functions. In this way, the signalling load is reduced and communication is more efficient, since less information needs to be transmitted.

In some embodiments, the method may comprise reselecting a plurality of service functions to connect in the service function chain for handling the packet forwarding control protocol session based on a load of one or more of the selected plurality of service functions and, for each user plane function node that supports one or more of the reselected plurality of service functions, initiating transmission of a request to the user plane function node to establish the packet forwarding control protocol session with the user plane function node. The request may comprise an indication of the one or more of the reselected plurality of service functions that the user plane function node supports. In this way, if the load of a service function changes, this can be taken into account when a reselection is made. Thus, overloading of service functions can be managed and avoided in this way.

In some embodiments, the method may comprise receiving, from a user plane function node that supports one or more of the selected plurality of service functions, an indication that at least one service function supported by the user plane function node is unavailable and updating the selection of the plurality of service functions to connect in the service function chain for handling the packet forwarding control protocol session based on the indication. In this way, if a service function becomes unavailable (e.g. is removed from the corresponding user plane function), the handling of the packet forwarding control protocol session is unaffected as another service function can be substituted by way of the reselection. Advantageously, unavailable service functions can be left out of the service function chain in an individual manner, while the rest of service functions can remain in the service function chain.

According to another aspect of the idea, there is provided a session management function node configured to operate in accordance with the method described earlier in respect of the session management function node. In some embodiments, the session management function node may comprise processing circuitry and at least one memory for storing instructions which, when executed by the processing circuitry, cause the session management function node to operate in accordance with the method described earlier in respect of the session management function node. The session management function node thus provides the advantages discussed earlier in respect of the method performed by the session management function node.

According to another aspect of the idea, there is provided a method performed by a user plane function node of a network for establishing a packet forwarding control protocol session. The method comprises receiving, from a session management function node, a request to establish the packet forwarding control protocol session with the user plane function node. The request comprises an indication of one or more selected service functions supported by the user plane function node and capable of activating a feature of the packet forwarding control protocol session. The one or more selected service functions are selected based on their load and are connected in a service function chain for handling the packet forwarding control protocol session. The method also comprises establishing the packet forwarding control protocol session using the one or more selected service functions. The user plane function node thus provides the advantages discussed earlier in respect of the method performed by the session management function node.

In some embodiments, establishing the packet forwarding control protocol session using the one or more selected service functions may comprise generating an identifier to identify the one or more selected service functions. Advantageously, the identifier is generated in the user plane function and it is thus not imposed by control plane (CP) nodes. This allows CP nodes to specify one or more features (or functionalities) that a service function is capable of activating but not an identifier that identifies the service function. In this way, the identifier is more flexible.

In some embodiments, establishing the packet forwarding control protocol session using the one or more selected service functions may comprise initiating transmission of the identifier and the one or more selected service functions to a service function forwarder node, and/or initiating transmission of the identifier and user plane traffic to the service function forwarder node for the service function forwarder node to forward the traffic to the one or more selected service functions identified by the identifier. In this way, the service function forwarder node can use the identifier to identify the one or more selected service functions, rather than the one or more selected service functions themselves. In this way, a more efficient communication is achieved.

In some embodiments, the method may comprise initiating transmission of the identifier to the session management function node. Thus, an identifier is used to identify the one or more selected plurality of service functions, which means that it is not necessary to specify specific service functions. In this way, the signalling load is reduced and communication is more efficient, since less information needs to be transmitted.

According to another aspect of the idea, there is provided a user plane function node configured to operate in accordance with the method described earlier in respect of the user plane function node. In some embodiments, the user plane function node may comprise processing circuitry and at least one memory for storing instructions which, when executed by the processing circuitry, cause the user plane function node to operate in accordance with the method described earlier in respect of the user plane function node. The user plane function node thus provides the advantages discussed earlier in respect of the method performed by the user plane function node.

According to another aspect of the idea, there is provided a system comprising at least one session management function node as described earlier and at least one user plane function node as described earlier. The system thus provides the advantages discussed earlier in respect of the method performed by the session management function node and the user plane function node.

According to another aspect of the idea, there is provided a computer program comprising instructions which, when executed by processing circuitry, cause the processing circuitry to perform the method described earlier. The computer program thus provides the advantages discussed earlier in respect of the method performed by the session management function node and the user plane function node.

According to another aspect of the idea, there is provided a computer program product, embodied on a non-transitory machine-readable medium, comprising instructions which are executable by processing circuitry to cause the processing circuitry to perform the method described earlier. The computer program product thus provides the advantages discussed earlier in respect of the method performed by the session management function node and the user plane function node.

Therefore, an advantageous technique for establishing a packet forwarding control protocol (PFCP) session is provided.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

Figure 1:
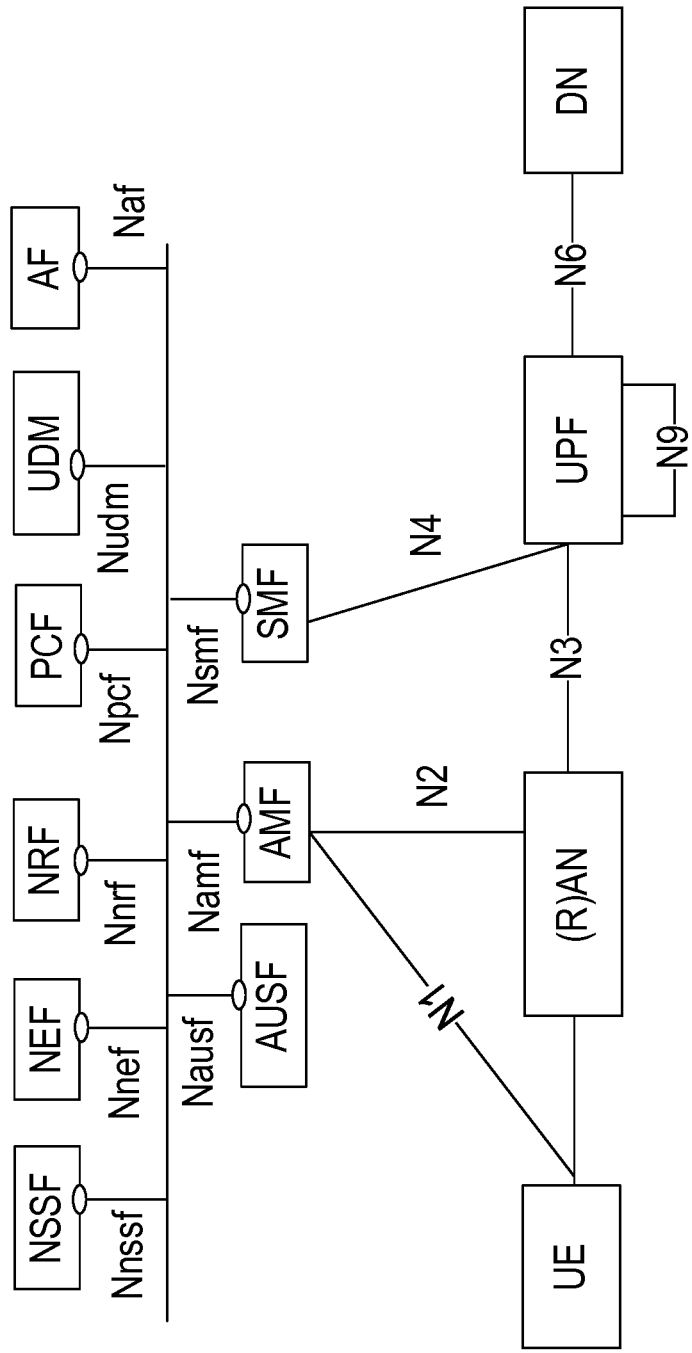
FIG. 1 is a block diagram illustrating an existing 5G network architecture.
Figure 2:
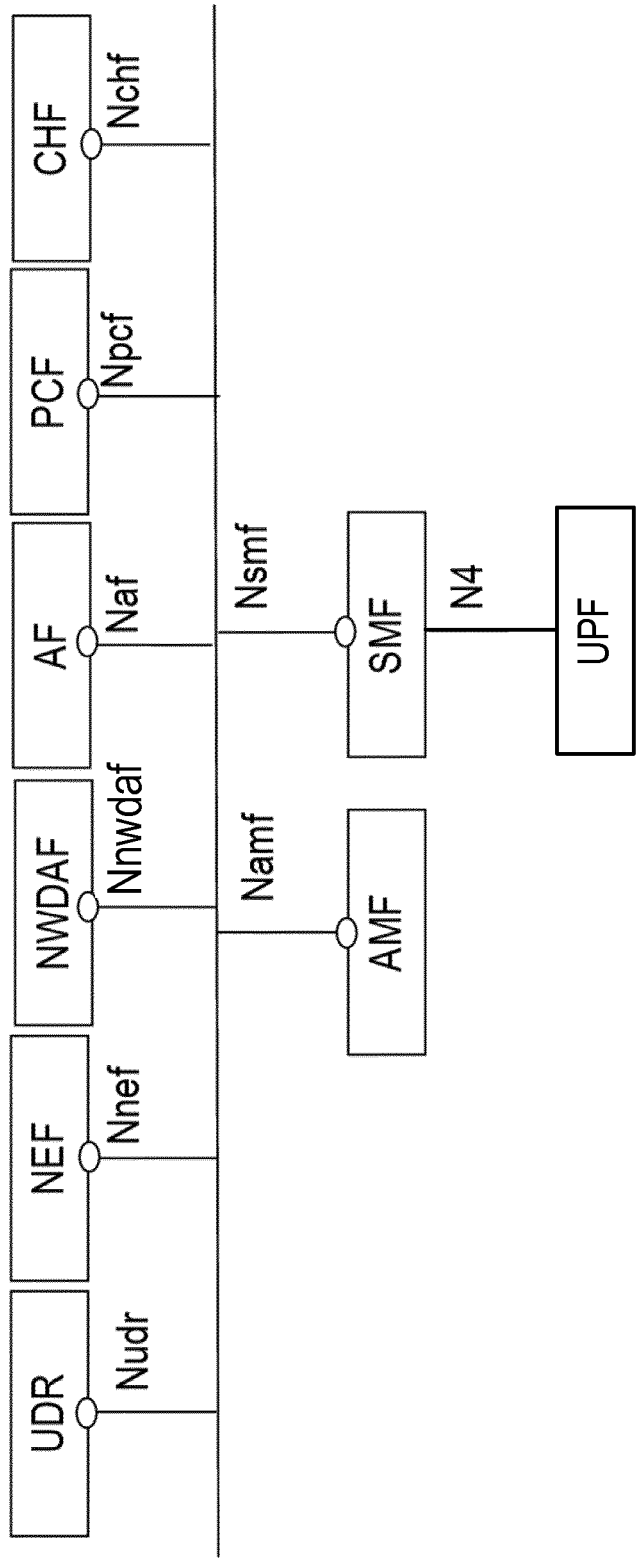
FIG. 2 is a block diagram illustrating an existing 5GC network architecture.
Figure 3:
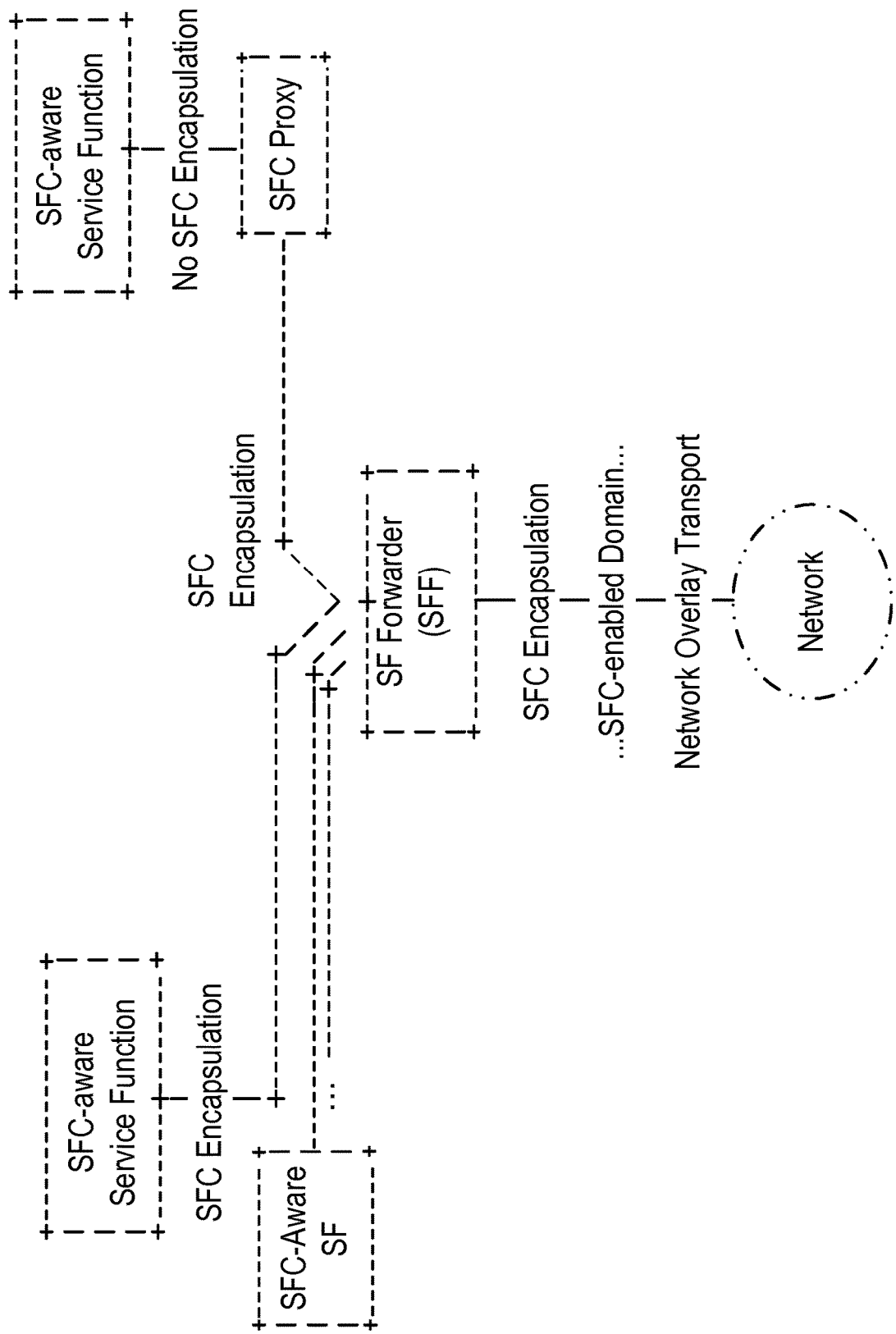
FIG. 3 is a block diagram illustrating an existing network architecture for SFC.
Figure 4:
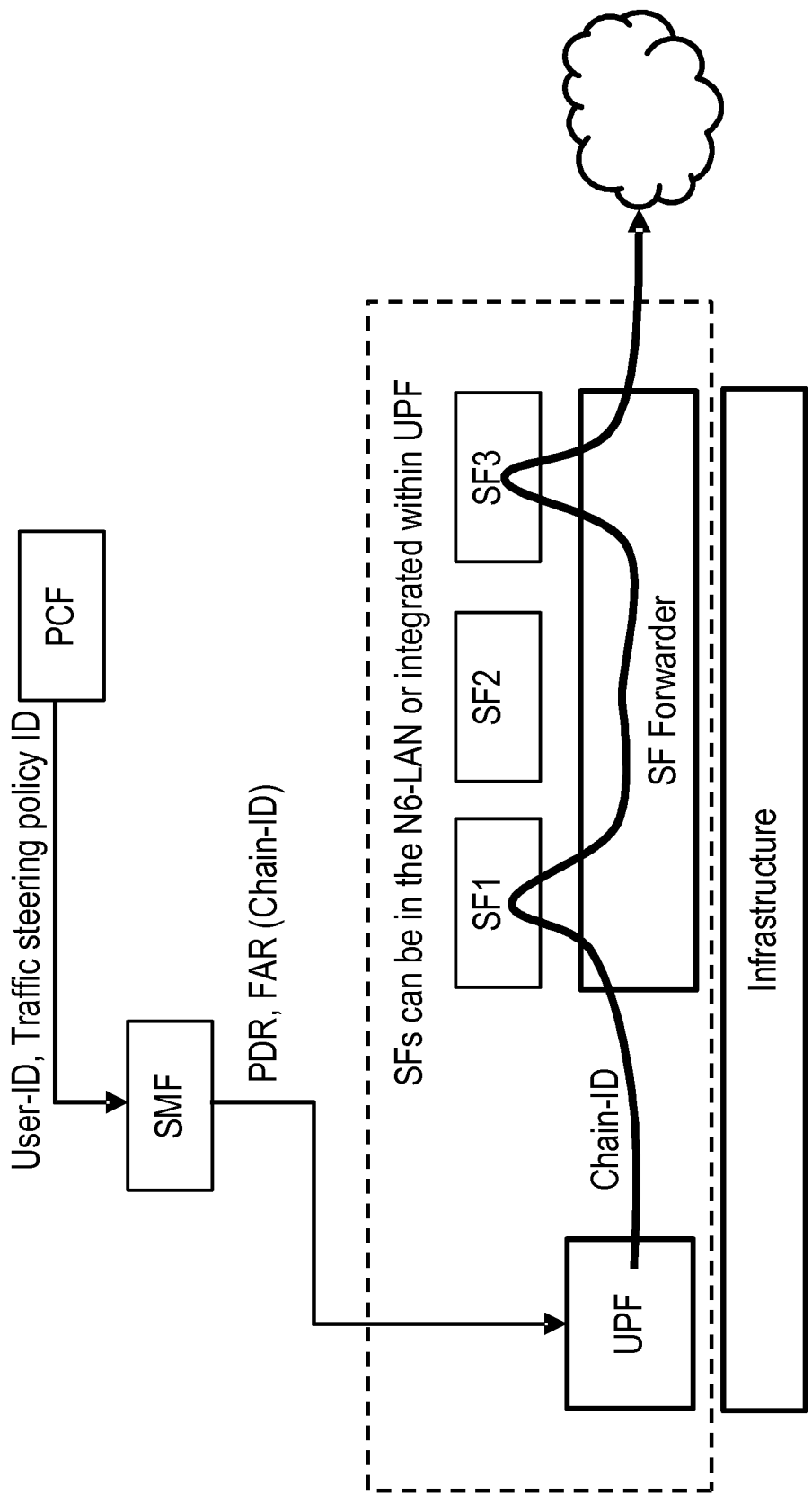
FIG. 4 is a block diagram illustrating an existing 5G network architecture.
Figure 5:
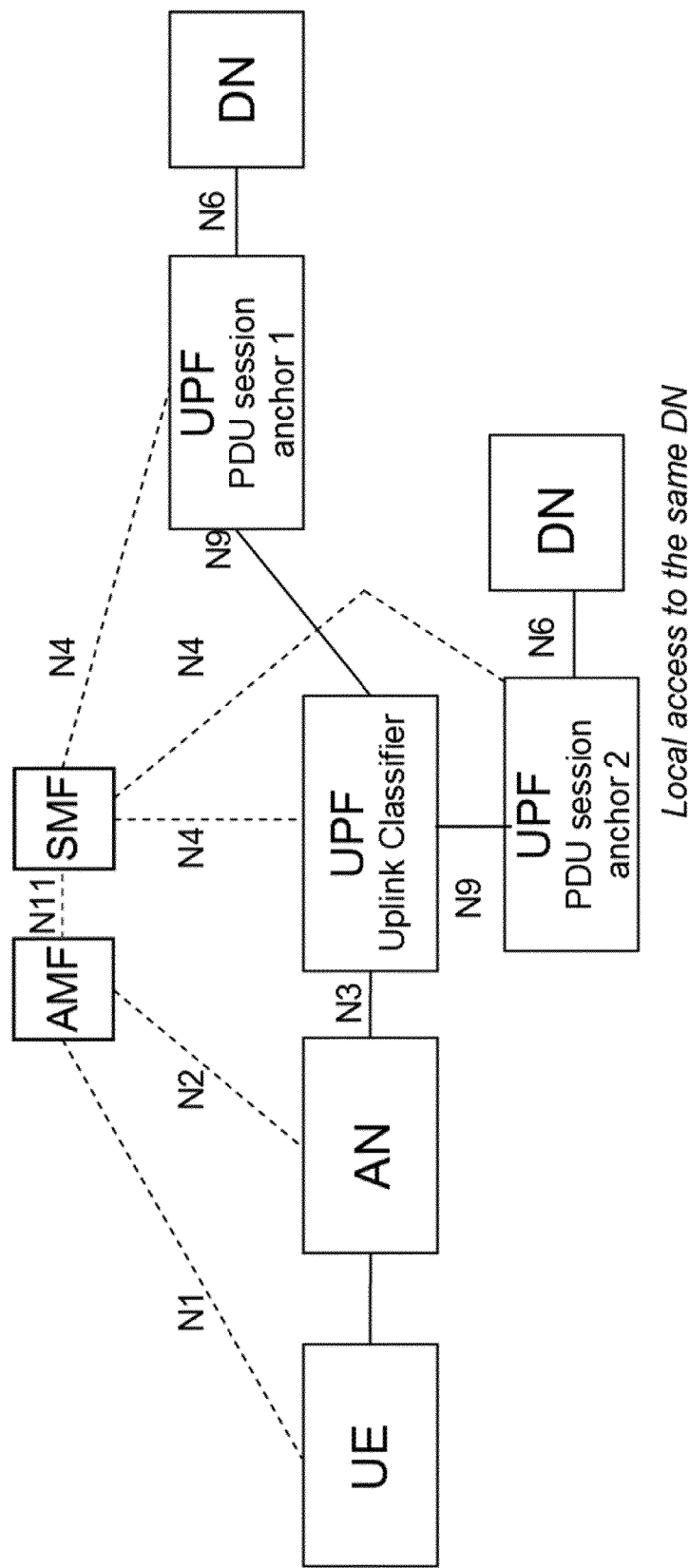
FIG. 5 is a block diagram illustrating an existing 5G network architecture.
Figure 6:
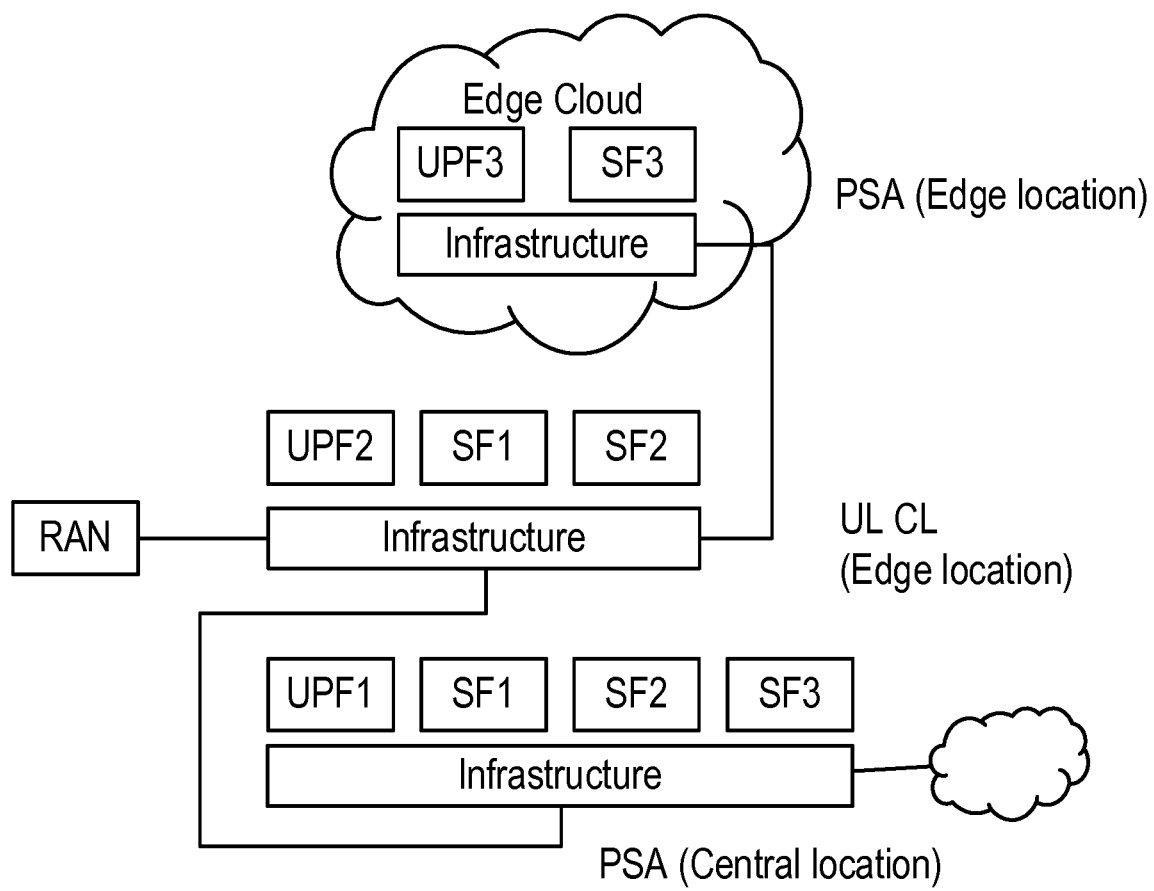
FIG. 6 is a block diagram illustrating an existing 5G network architecture.
Figure 7:
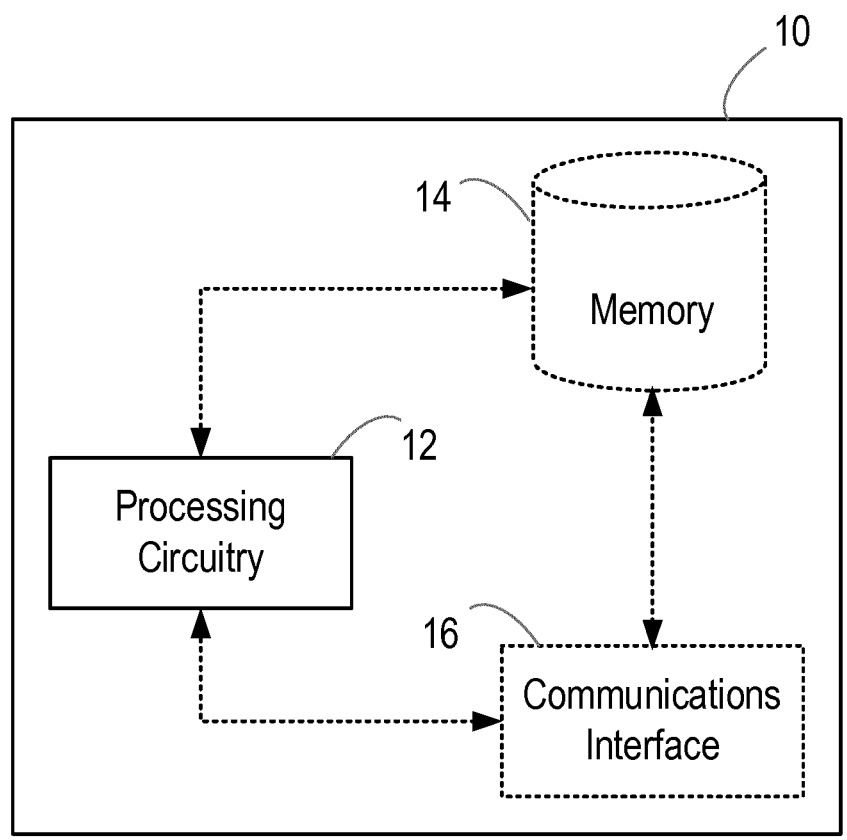
FIG. 7 is a block diagram illustrating a session management function node according to an embodiment.

FIG. 7 illustrates a session management function (SMF) node 10 in accordance with an embodiment. The SMF node 10 is for establishing a packet forwarding control protocol (PFCP) session. The SMF node 10 is a node of a network, e.g. a 5G network. The PFCP session can be any session between the SMF node 10 of the network and a user plane function (UPF) node of the network. For each protocol data unit (PDU) session in the network, there may be a PFCP session with each UPF node of the network. Herein, a PDU session can be any session between a user equipment (UE) of the network and a data network.

As illustrated in FIG. 7, the SMF node 10 comprises processing circuitry (or logic) 12. The processing circuitry 12 controls the operation of the SMF node 10 and can implement the method described herein in respect to the SMF node 10. The processing circuitry 12 can comprise one or more processors, processing units, multi-core processors or modules that are configured or programmed to control the SMF node 10 in the manner described herein. In particular implementations, the processing circuitry 12 of the SMF node 10 can comprise a plurality of software and/or hardware modules that are each configured to perform, or are for performing, individual or multiple steps of the method described herein.

Briefly, the processing circuitry 12 of the SMF node 10 is configured to select a plurality of service functions (SFs) to connect in a service function (SF) chain for handling the PFCP session. Each of the plurality of SFs is capable of activating a feature (e.g. a function or functionality) of the PFCP session and is supported by a UPF node. The selection is based on a load of each of the plurality of SFs. The processing circuitry 12 of the SMF node 10 is also configured to, for each UPF node that supports one or more of the selected plurality of SFs, initiate transmission of a request to the UPF node to establish the PFCP session with the UPF node. The request comprises an indication of the one or more of the selected plurality of SFs that the UPF node supports.

As illustrated in FIG. 7, the SMF node 10 may optionally comprise memory 14. The memory 14 of the SMF node 10 can comprise a volatile memory or a non-volatile memory. In some embodiments, the memory 14 of the SMF node 10 may comprise a non-transitory media. Examples of the memory 14 of the SMF node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the SMF node 10 can be connected to the memory 14 of the SMF node 10. In some embodiments, the memory 14 of the SMF node 10 may be for storing program code or instructions which, when executed by the processing circuitry 12 of the SMF node 10, cause the SMF node 10 to operate in the manner described herein in respect of the SMF node 10. For example, in some embodiments, the memory 14 of the SMF node 10 may be configured to store program code or instructions that can be executed by the processing circuitry 12 of the SMF node 10 to cause the SMF node 10 to operate in accordance with the method described herein in respect of the SMF node 10. Alternatively or in addition, the memory 14 of the SMF node 10 can be configured to store any parameters, requests, responses, indications, information, data, notifications, signals, or similar, that are described herein. The processing circuitry 12 of the SMF node 10 may be configured to control the memory 14 of the SMF node 10 to store any parameters, requests, responses, indications, information, data, notifications, signals, or similar, that are described herein.

In some embodiments, as illustrated in FIG. 7, the SMF node 10 may optionally comprise a communications interface 16. The communications interface 16 of the SMF node 10 can be connected to the processing circuitry 12 of the SMF node 10 and/or the memory 14 of SMF node 10. The communications interface 16 of the SMF node 10 may be operable to allow the processing circuitry 12 of the SMF node 10 to communicate with the memory 14 of the SMF node 10 and/or vice versa. The communications interface 16 of the SMF node 10 can be configured to transmit and/or receive any parameters, requests, responses, indications, information, data, notifications, signals, or similar, that are described herein. In some embodiments, the processing circuitry 12 of the SMF node 10 may be configured to control the communications interface 16 of the SMF node 10 to transmit and/or receive any parameters, requests, responses, indications, information, data, notifications, signals, or similar, that are described herein.

Although the SMF node 10 is illustrated in FIG. 7 as comprising a single memory 14, it will be appreciated that the SMF node 10 may comprise at least one memory (i.e. a single memory or a plurality of memories) 14 that operate in the manner described herein. Similarly, although the SMF node 10 is illustrated in FIG. 7 as comprising a single communications interface 16, it will be appreciated that the SMF node 10 may comprise at least one communications interface (i.e. a single communications interface or a plurality of communications interface) 16 that operate in the manner described herein.

It will also be appreciated that FIG. 7 only shows the components required to illustrate an embodiment of the SMF node 10 and, in practical implementations, the SMF node 10 may comprise additional or alternative components to those shown.

Figure 8:
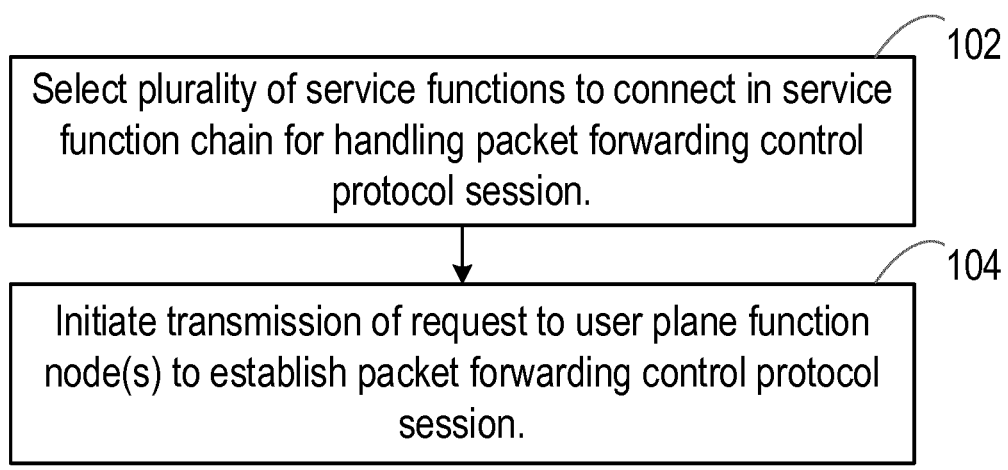
FIG. 8 is a block diagram illustrating a method performed by a session management function node according to an embodiment.

FIG. 8 is a flowchart illustrating a method performed by an SMF node 10 in accordance with an embodiment. The method is for establishing a PFCP session. As mentioned earlier, the PFCP session is between the SMF node 10 and the UPF node. The SMF node 10 described earlier with reference to FIG. 7 is configured to operate in accordance with the method of FIG. 8. The method can be performed by or under the control of the processing circuitry 12 of the SMF node 10.

Although not illustrated in FIG. 8, in some embodiments, one or more UPF nodes may register with the SMF node 10 the SFs that they support and the load of each of the SFs that they support. The load referred to herein can, for example, be defined in terms of capacity. For example, the load may be defined in terms of central processing unit (CPU) capacity, memory capacity, traffic load capacity, maximum number of users, number of virtual machines (VMs), and/or any other type of capacity. The one or more UPF nodes can also register with the SMF node 10 one or more features (e.g. one or more functions or functionalities) of a PFCP session that the SFs they support are capable of activating. The one or more features of the PFCP referred to herein can, for example, comprise one or more user plane (UP) features according to some embodiments. Examples of features of the PFCP session referred to herein can include, but are not limited to, firewalling, quality of service (QoS), distributed denial of service (DDoS) detection, or any other feature of the PFCP session. This registration can take place at PFCP association or by means of an explicit register message. In some embodiments, one or more UPF nodes may deregister or remove any SF from the SMF node 10.

With reference to FIG. 8, at block 102, a plurality of SFs is selected to connect in an SF chain for handling the PFCP session. More specifically, the processing circuitry 12 of the SMF node 10 selects the plurality of service functions to connect in the SF chain for handling the PFCP session. The selection of the plurality of SFs to connect in the SF chain for handling the PFCP session is based on a load of each of the plurality of SFs. In some embodiments, the plurality of SFs may be selected in response to a determination that a plurality of UPF nodes are required for handling the PFCP session. In some embodiments, the selection may be based on a location of each UPF node that supports one or more of the plurality of SFs. For example, in some embodiments, each of the selected plurality of SFs may be supported by a UPF node that is located at a predefined location.

Each of the selected plurality of SFs is capable of activating a feature of the PFCP session and is supported by a UPF node. In some embodiments, a policy control function (PCF) node may provide an indication (e.g. a list) of one or more features of the PFCP session to activate. Thus, in some embodiments, the processing circuitry 12 of the SMF node 10 can be configured to acquire an indication (e.g. a list) of one or more features of the PFCP session to activate from a PCF node. In some embodiments, the one or more features of the PFCP session to activate may be on a per user and/or per application basis. Thus, in some embodiments, the plurality of SFs may be selected according to one or more features of the PFCP session required for a certain user and/or application. In some embodiments, the one or more features of the PFCP session to activate may be provided with traffic steering information.

Returning back to FIG. 8, at block 104, for each UPF node that supports one or more of the selected plurality of SFs, transmission of a request is initiated to the UPF node to establish the PFCP session with the UPF node. More specifically, the processing circuitry 12 of the SMF node 10 initiates the transmission of the request (e.g. via the communications interface 16). The request comprises an indication (e.g. an identity, which can be referred to as the "SF-ID") of the one or more of the selected plurality of SFs that the UPF node supports. In some embodiments, the indication may comprise an ordered list of the one or more of the selected plurality of SFs that the UPF node supports (e.g. an ordered list of SF-IDs).

Although not illustrated in FIG. 8, in some embodiments, for each UPF node that supports one or more of the selected plurality of SFs, an identifier may be received that identifies one or more of the selected plurality of SFs that the UPF node supports. Thus, in some embodiments, the processing circuitry 12 of the SMF node 10 may be configured to receive the identifier (e.g. via the communications interface 16). The identifier can be received from the UPF node.

Although also not illustrated in FIG. 8, in some embodiments, a plurality of SFs may be reselected to connect in the SF chain for handling the PFCP session based on a load of one or more of the selected plurality of SFs. Thus, in some embodiments, the processing circuitry 12 of the SMF node 10 may be configured to reselect the plurality of SFs to connect in the SF chain. This may involve the processing circuitry 12 of the SMF node 10 triggering a reselection of one or more UPF nodes, which can involve a complete change from one or more UPF nodes to one or more other UPF nodes or a reselection of one or more SFs of one or more UPF nodes to one or more SFs of one or more other UPF nodes. In these embodiments, for each UPF node that supports one or more of the reselected plurality of SFs, transmission of a request may be initiated to the UPF node to establish the PFCP session with the UPF node. Thus, in some embodiments, the processing circuitry 12 of the SMF node 10 may be configured to initiate the transmission of this request. The request can comprise an indication of the one or more of the reselected plurality of SFs that the UPF node supports.

Although also not illustrated in FIG. 8, in some embodiments, the method may comprise receiving, from a UPF node that supports one or more of the selected (or reselected) plurality of SFs, an indication that at least one SF supported by the UPF node is unavailable (e.g. has been removed). Thus, in some embodiments, the processing circuitry 12 of the SMF node 10 may be configured to receive the indication (e.g. via the communications interface 16). In some of these embodiments, the selection (or reselection) of the plurality of SFs to connect in the service function chain for handling the packet forwarding control protocol session may be updated based on the indication. The processing circuitry 12 of the SMF node 10 may thus be configured to update the selection of the plurality of SFs in this way according to some embodiments.

Figure 9:
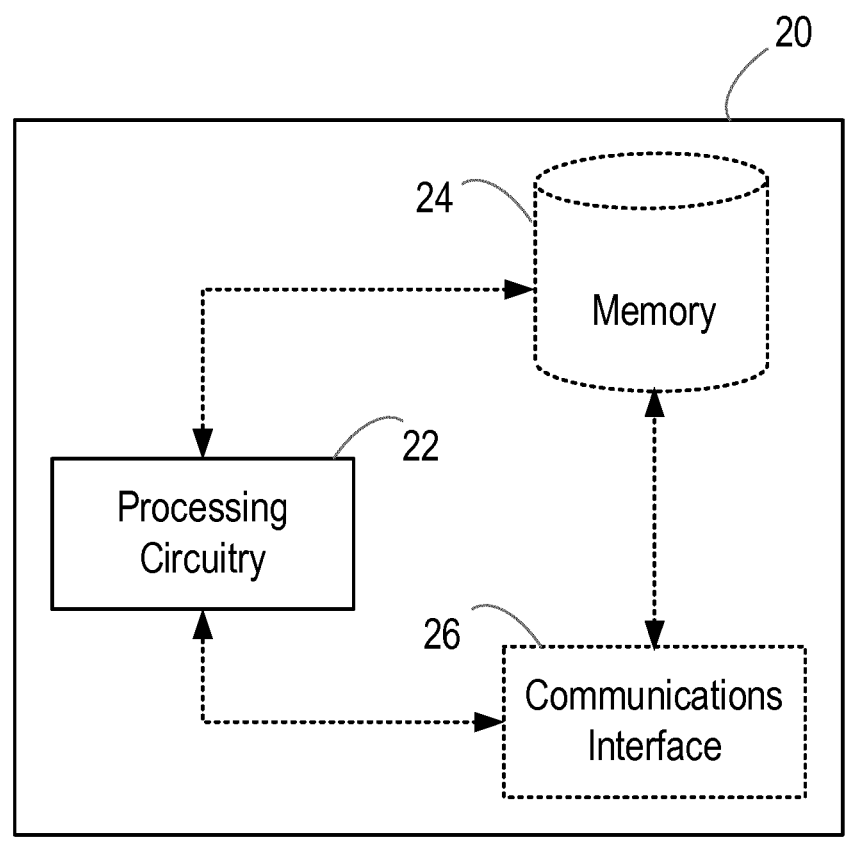
FIG. 9 is a block diagram illustrating a user plane function node according to an embodiment.

FIG. 9 illustrates a user plane function (UPF) node 20 in accordance with an embodiment. The UPF node 20 is for establishing a packet forwarding control protocol (PFCP) session. As mentioned earlier, the PFCP session is between the SMF node 10 and the UPF node 20. The UPF node 20 is a node of a network, e.g. a 5G network. The PFCP session can be any session between the SMF node 10 of the network and the user plane function (UPF) node 20 of the network. For each protocol data unit (PDU) session in the network, there may be a PFCP session with each UPF node of the network. Herein, a PDU session can be any session between a user equipment (UE) of the network and a data network.

As illustrated in FIG. 9, the UPF node 20 comprises processing circuitry (or logic) 22. The processing circuitry 22 controls the operation of the UPF node 20 and can implement the method described herein in respect to the UPF node 20. The processing circuitry 22 can comprise one or more processors, processing units, multi-core processors or modules that are configured or programmed to control the UPF node 20 in the manner described herein. In particular implementations, the processing circuitry 22 of the UPF node 20 can comprise a plurality of software and/or hardware modules that are each configured to perform, or are for performing, individual or multiple steps of the method described herein.

Briefly, the processing circuitry 22 of the UPF node 20 is configured to receive, from an SMF node 10, a request to establish the PFCP session with the UPF node 20. The request comprises an indication of one or more selected SFs supported by the UPF node 20 and capable of activating a feature of the PFCP session. The one or more selected SFs are selected based on their load and are connected in an SF chain for handling the PFCP session. The processing circuitry 22 of the UPF node 20 is also configured to establish the PFCP session using the one or more selected SFs.

As illustrated in FIG. 9, the UPF node 20 may optionally comprise memory 24. The memory 24 of the UPF node 20 can comprise a volatile memory or a non-volatile memory. In some embodiments, the memory 24 of the UPF node 20 may comprise a non-transitory media. Examples of the memory 24 of the UPF node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the UPF node 20 can be connected to the memory 24 of the UPF node 20. In some embodiments, the memory 24 of the UPF node 20 may be for storing program code or instructions which, when executed by the processing circuitry 22 of the UPF node 20, cause the UPF node 20 to operate in the manner described herein in respect of the UPF node 20. For example, in some embodiments, the memory 24 of the UPF node 20 may be configured to store program code or instructions that can be executed by the processing circuitry 22 of the UPF node 20 to cause the UPF node 20 to operate in accordance with the method described herein in respect of the UPF node 20. Alternatively or in addition, the memory 24 of the UPF node 20 can be configured to store any parameters, requests, responses, indications, information, data, notifications, signals, or similar, that are described herein. The processing circuitry 22 of the UPF node 20 may be configured to control the memory 24 of the UPF node 20 to store any parameters, requests, responses, indications, information, data, notifications, signals, or similar, that are described herein.

In some embodiments, as illustrated in FIG. 9, the UPF node 20 may optionally comprise a communications interface 26. The communications interface 26 of the UPF node 20 can be connected to the processing circuitry 22 of the UPF node 20 and/or the memory 24 of UPF node 20. The communications interface 26 of the UPF node 20 may be operable to allow the processing circuitry 22 of the UPF node 20 to communicate with the memory 24 of the UPF node 20 and/or vice versa. The communications interface 26 of the UPF node 20 can be configured to transmit and/or receive any parameters, requests, responses, indications, information, data, notifications, signals, or similar, that are described herein. In some embodiments, the processing circuitry 22 of the UPF node 20 may be configured to control the communications interface 26 of the UPF node 20 to transmit and/or receive any parameters, requests, responses, indications, information, data, notifications, signals, or similar, that are described herein.

Although the UPF node 20 is illustrated in FIG. 9 as comprising a single memory 24, it will be appreciated that the UPF node 20 may comprise at least one memory (i.e. a single memory or a plurality of memories) 24 that operate in the manner described herein. Similarly, although the UPF node 20 is illustrated in FIG. 9 as comprising a single communications interface 26, it will be appreciated that the UPF node 20 may comprise at least one communications interface (i.e. a single communications interface or a plurality of communications interface) 26 that operate in the manner described herein.

It will also be appreciated that FIG. 9 only shows the components required to illustrate an embodiment of the UPF node 20 and, in practical implementations, the UPF node 20 may comprise additional or alternative components to those shown.

Figure 10:
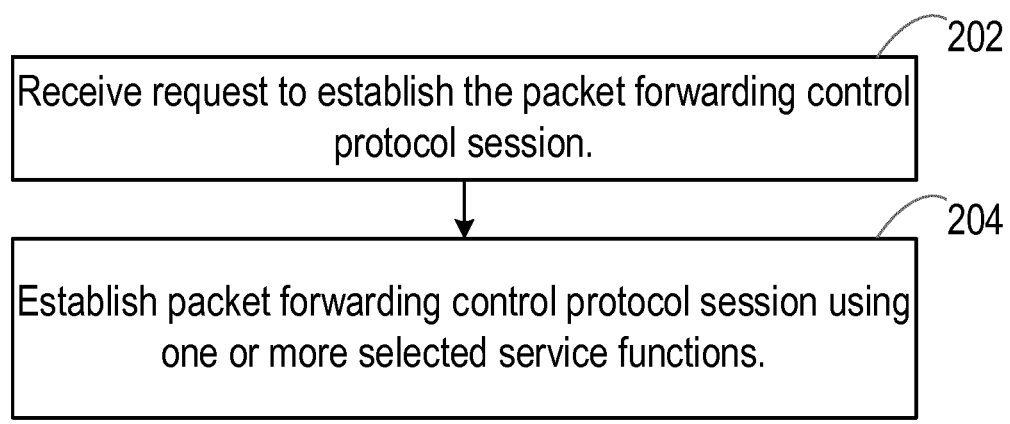
FIG. 10 is a block diagram illustrating a method performed by a user plane function node according to an embodiment.

FIG. 10 is a flowchart illustrating a method performed by a UPF node 20 in accordance with an embodiment. The method is for establishing a PFCP session. As mentioned earlier, the PFCP session is between the SMF node 10 and the UPF node 20. The UPF node 20 described earlier with reference to FIG. 9 is configured to operate in accordance with the method of FIG. 10. The method can be performed by or under the control of the processing circuitry 22 of the UPF node 20.

With reference to FIG. 10, at block 202, a request to establish the PFCP session with the UPF node 20 is received from an SMF node 10. More specifically, the processing circuitry 22 of the UPF node 20 receives the request (e.g. via the communications interface 26). The request comprises an indication of one or more selected SFs supported by the UPF node 20 and capable of activating a feature of the PFCP session. The one or more selected SFs are selected based on their load and are connected in an SF chain for handling the PFCP session.

At block 204 of FIG. 10, the PFCP session is established using the one or more selected SFs. More specifically, the processing circuitry 22 of the UPF node 20 establishes the PFCP session. In some embodiments, establishing the PFCP session using the one or more selected service functions may comprise generating an identifier to identify the one or more selected SFs. That is, an identifier to identify the one or more selected SFs of the UPF node 20 that are connected in the SF chain for handling the PFCP session, which may be referred to as a "Chain-ID". In some of these embodiments, establishing the PFCP session using the one or more selected SFs may also comprise initiating transmission of the identifier and the one or more selected SFs to an SF forwarder (SFF) node, and/or initiating transmission of the identifier and UP traffic to the SFF node for the SFF node to forward the traffic to the one or more selected SFs identified by the identifier. Thus, in some embodiments, the processing circuitry 22 of the UPF node 20 can be configured to initiate the transmission of the identifier (e.g. via the communications interface 26). In some embodiments, the transmission of the identifier may be initiated to the SMF node 10.

As mentioned earlier, in some embodiments, a PCF node may provide to the SMF node 10 an indication (e.g. a list) of one or more features of the PFCP session to activate. In some of these embodiments, the PCF node may dynamically update the indication (e.g. list) of features to activate, e.g. for a given user. In this case, for example, the PCF may send a dynamic policy and charging control (PCC) rule to the SMF node 10 including the new indication (e.g. list) of UP features that are to be activated. In some of these embodiments, although not illustrated in FIG. 8, the SMF node 10 may be configured to send to the UPF node 20 a PFCP session establishment modification including a forwarding action rule (FAR) with an indication of one or more of the selected plurality of SFs that the UPF node 20 supports, e.g. in the form of an ordered list (such as an ordered list of SF-IDs). In some of these embodiments, although not illustrated in FIG. 10, the UPF node 20 may send to the SFF an update of the SFs connected in the SF chain for handling the PFCP session, e.g. an updated identifier (Chain-ID) to identify the one or more selected SFs of the UPF node 20 that are connected in the SF chain for handling the PFCP session.

In some embodiments, if the processing circuitry 12 of the SMF node 10 decides not to chain any SF (e.g. for a specific user) supported by a UPF node 20, the processing circuitry 12 of the SMF node 10 may send to the UPF node 20 a message (which can be referred to as an "SF chain remove message") indicating the removal of that SF from the chain. The message may, for example, comprise the Chain-ID and/or an identifier to identify the user (which can be referred to as the "User-ID"). In some of these embodiments, the processing circuitry 22 of the UPF node 20 can be configured to also remove the chain from the SFF node, e.g. by being configured to send the SF chain remove message to the SFF node.

In single UPF node 20 scenarios, the processing circuitry 12 of the SMF node 10 can be configured to detect malfunctioning SFs (e.g. in terms of load, latency, failures, etc.) according to some embodiments. In these embodiments, the processing circuitry 12 of the SMF node 10 may also be configured to (e.g. dynamically) bypass the malfunctioning SFs. For example, in the manner described earlier, the processing circuitry 12 of the SMF node 10 may be configured to reselect the plurality of SFs to connect in the SF chain according to some embodiments. Similarly, in some embodiments, the UPF node 20 can be configured to (e.g. dynamically) bypass malfunctioning SFs.

Figure 11:
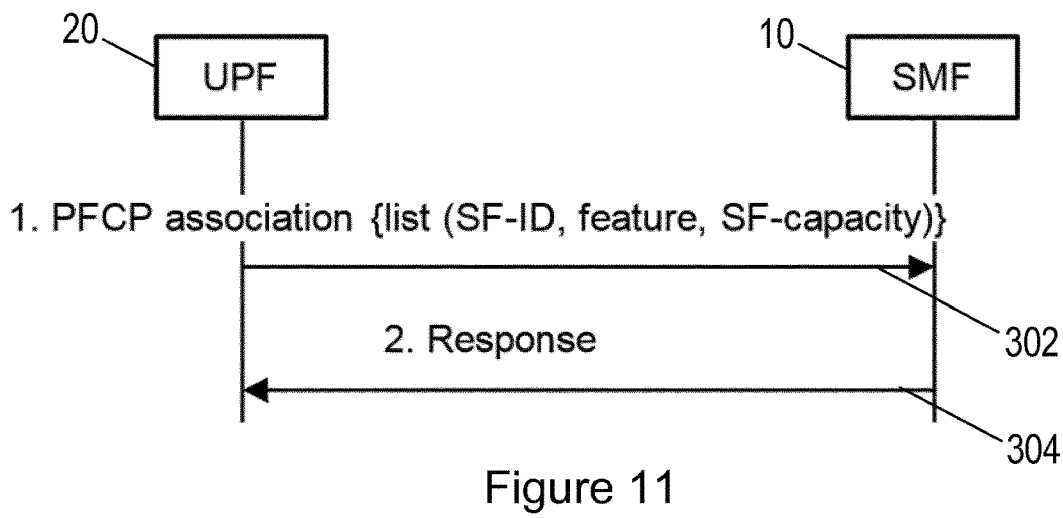
FIG. 11 is a signalling diagram illustrating an exchange of signals according to an embodiment.

FIG. 11 is a signalling (or call flow) diagram illustrating an exchange of signals in an example embodiment. The exchange of signals is in a network. The network comprises an SMF node 10 and a UPF node 20. In more detail, FIG. 11 depicts a PFCP association procedure between the UPF node 20 and the SMF node 10.

As illustrated by arrow 302 of FIG. 11, in some embodiments, the UPF node 20 may send to the SMF node 10 a PFCP association message. This PFCP association message may comprise a list of tuples. The PFCP association message may comprise (or, where the PFCP association message comprises a list of tuples, a tuple may comprise) an indication of the load of one or more SFs that the UPF node 20 supports. As mentioned earlier, in some embodiments, the load may be defined in terms of the capacity of each of the one or more SFs (e.g. in terms of central processing unit capacity, memory capacity, traffic load capacity, maximum number of users, number of virtual machines (VMs), and/or any other type of capacity). In some embodiments, the PFCP association message may comprise (or, where the PFCP association message includes a list of tuples, each tuple may comprise) an identifier ("SF-ID") that identifies the one or more SFs that the UPF node 20 supports, and/or an indication of one or more features supported by each of the one or more SFs (that is, one or more features that each of the one or more SFs are capable of activating, such as any of those mentioned earlier).

As illustrated by arrow 304 in FIG. 11, in response to receiving the PFCP association message from the UPF node 20, the SMF node 10 may send to the UPF node 20 a PFCP association response message.

Figure 12:
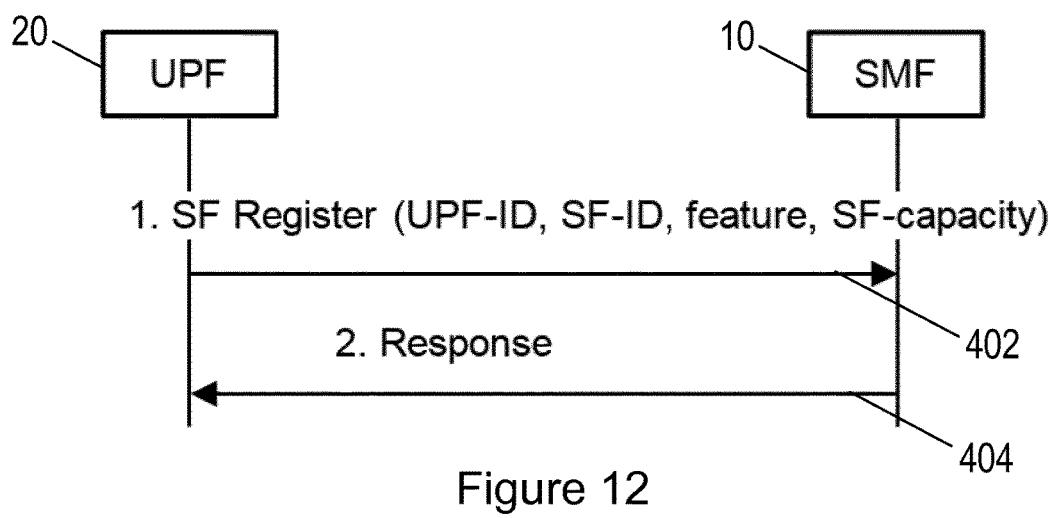
FIG. 12 is a signalling diagram illustrating an exchange of signals according to an embodiment.

FIG. 12 is a signalling (or call flow) diagram illustrating an exchange of signals in an example embodiment. The exchange of signals is in a network. The network comprises an SMF node 10 and a UPF node 20. In more detail, FIG. 12 depicts an explicit SF register between the UPF node 20 and the SMF node 10.

As illustrated by arrow 402 of FIG. 12, in some embodiments, the UPF node 20 may send to the SMF node 10 an SF register message. The SF register message may comprise an indication of the load of one or more SFs that the UPF node 20 supports. As mentioned earlier, in some embodiments, the load may be defined in terms of the capacity of each of the one or more SFs (e.g. in terms of central processing unit capacity, memory capacity, traffic load capacity, maximum number of users, number of virtual machines (VMs), and/or any other type of capacity). In some embodiments, the SF register message may comprise an identifier ("UPF-ID") that identifies the UPF node 20, an identifier ("SF-ID") that identifies the one or more SFs that the UPF node 20 supports, and/or an indication of one or more features supported by each of the one or more SFs (that is, one or more features that each of the one or more SFs are capable of activating, such as any of those mentioned earlier).

As illustrated by arrow 404 in FIG. 12, the SMF node 10 may send to the UPF node 20 a response message acknowledging the registration.

Figure 13:
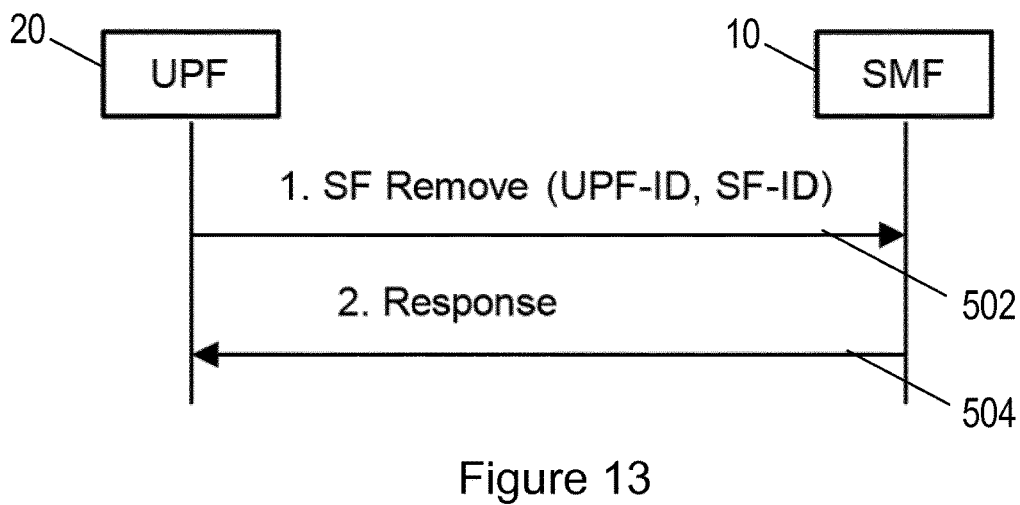
FIG. 13 is a signalling diagram illustrating an exchange of signals according to an embodiment.

FIG. 13 is a signalling (or call flow) diagram illustrating an exchange of signals in an example embodiment. The exchange of signals is in a network. The network comprises an SMF node 10 and a UPF node 20. In more detail, FIG. 13 depicts an SF removal notification process between the UPF node 20 and the SMF node 10.

As described earlier, in some embodiments, the SMF node 10 may receive, from a UPF node 20, an indication that at least one SF supported by the UPF node is unavailable (e.g. has been removed) and may then update the selection of the plurality of SFs to connect in the SF chain for handling the PCFP session based on the indication.

For example, in some embodiments, as illustrated by arrow 502 of FIG. 13, a UPF node 20 may send to the SMF node 10 a SF remove message. The SF remove message may comprise an identifier ("UPF-ID") that identifies the UPF node 20 and an identifier ("SF-ID") that identifies one or more SFs previously supported by the UPF node 20, which have since been removed. As illustrated by arrow 504 in FIG. 13, the SMF node 10 may send to the UPF node 20 a response message acknowledging the removal of the one or more identified SFs.

Figure 14A:
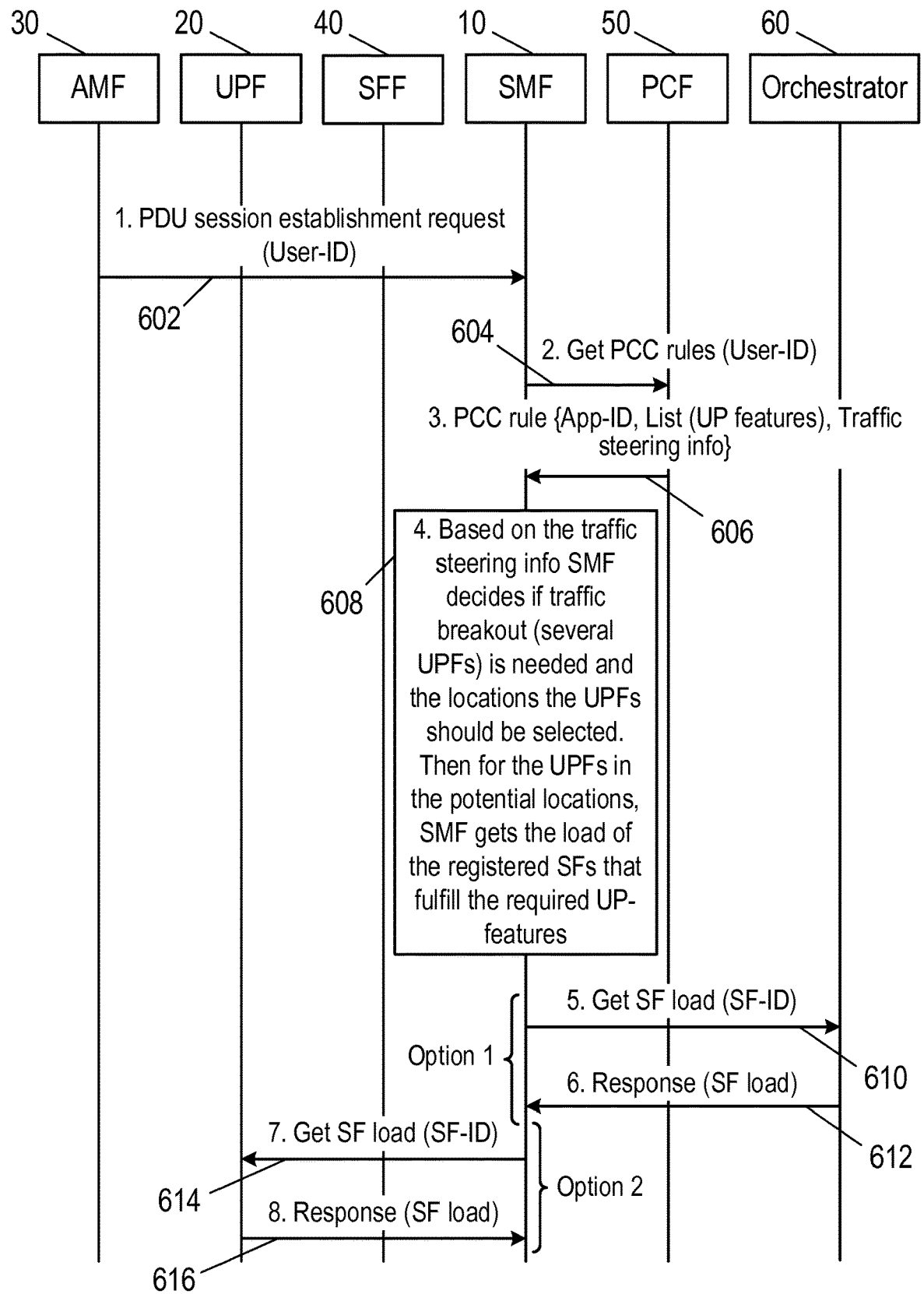
FIG. 14 is a signalling diagram illustrating an exchange of signals according to an embodiment.
Figure 14B:
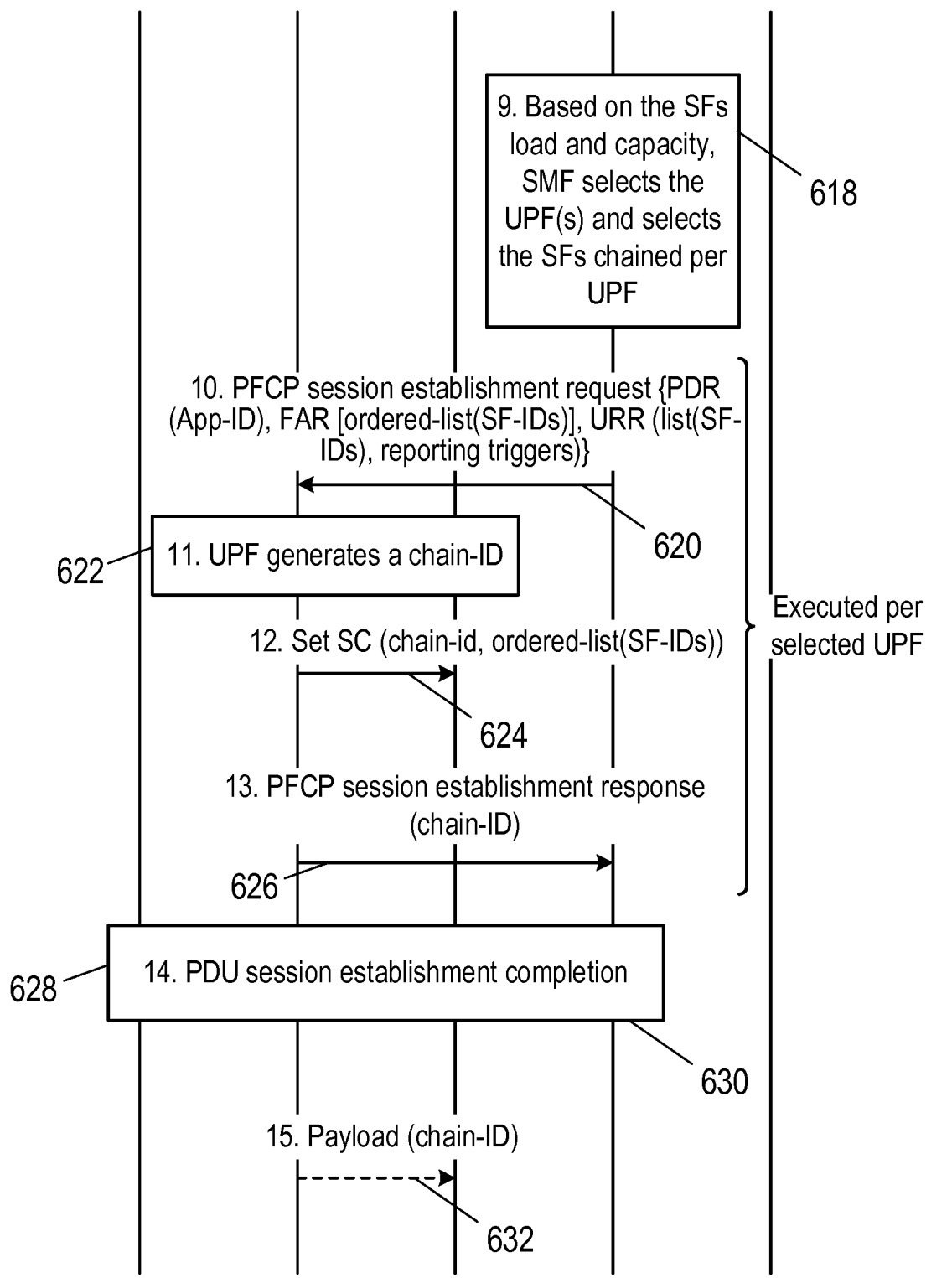

FIG. 14a-b is a signalling (or call flow) diagram illustrating an exchange of signals in an example embodiment. The exchange of signals is in a network. The network comprises an SMF node 10 and a UPF node 20. In addition, the network in this illustrated example embodiment also comprises an access and mobility management function (AMF) node 30, a service function forwarder (SFF) node 40, a policy control function (PCF) node 50 and an orchestrator node 60.

In more detail, FIG. 14a-b depicts an SF configuration process at protocol data unit (PDU) session establishment. The PDU session that is established is between a user equipment (UE) of the network and a data network (not illustrated). For each protocol data unit (PDU) session that is established, there is a packet forwarding control protocol (PFCP) session between the SMF node 10 and each UPF node 20.

As illustrated by arrow 602 in FIG. 14a, in some embodiments, the AMF node 30 may send to the SMF node 10 a PDU session establishment request. The PDU session establishment request may comprise an identifier of a user ("User-ID"). As illustrated by arrow 604 in FIG. 14a, the SMF node 10 may send to the PCF node 50 a request to get the policy and charging control (PCC) rules for the identified user.

As illustrated by arrow 606 in FIG. 14a, in response to a request to get the PCC rules, the PCF node 50 may send to the SMF node 10 the PCC rules for the identified user. These PCC rules may, for example, include an identifier of an application ("App-ID"), an indication (e.g. a list) of one or more features to activate in the UPF node 20 (such as any of those mentioned earlier), and/or traffic steering information. The one or more features may be one or more user plane (UP) features.

At block 608 in FIG. 14a, the SMF node 10 may decide if traffic breakout is needed (i.e. if several UPF nodes 20 are needed) and the locations at which the UPF nodes 20 are to be selected. This may be decided at PDU session establishment and/or based on traffic steering information. For the UPF nodes 20 in the potential locations, the SMF node 10 gets the load of the registered SFs that fulfil the indicated features. Each of the SFs may have a respective orchestrator node 60. As illustrated by arrow 610 in FIG. 14a, the SMF node 10 can query the orchestrator node 60 of the SF for the SF load. The query may, for example, include an identifier ("SF-ID") that identifies the SF. As illustrated by arrow 612 in FIG. 14a, the orchestrator node 60 responds to the SMF node 10 with the SF load. Alternatively to arrows 610 and 612 in FIG. 14a, if the UPF node 20 is aware of the load of the SF, as illustrated by arrows 614 and 616 in FIG. 14a respectively, the SMF node 10 can query the UPF node 20 that is hosting the SF (and may, for example, include an identifier ("SF-ID") that identifies the SF in the query) and the UPF node 20 may respond to the SMF node 10 with the SF load.

Once the SMF node 10 has all of the information (e.g. the information received from the PCF node 50, the registered SFs and the load of the SFs), the process moves to block 618 in FIG. 14b. At block 618 in FIG. 14b, the method illustrated in FIG. 8 is performed. That is, the SMF node 10 selects a plurality of SFs to connect in an SF chain for handling a PFCP session based on a load (e.g. in terms of the capacity) of each of the plurality of SFs. For example, the SMF node 10 may select one or more UPF nodes 20 for the PFCP session and the SMF node 10 may select the SFs to be chained per selected UPF. Also, for each UPF node that supports one or more of the selected plurality of SFs, the SMF node 10 initiates transmission of a request to the UPF node 20 to establish the PFCP session with the UPF node 20. In this way, the SMF node 10 establishes the PFCP session with each selected UPF.

In more detail, as illustrated by arrow 620 in FIG. 14b, the SMF node 10 sends to each selected UPF node 20 a PFCP session establishment request. The PFCP session establishment request may, for example, comprise a packet detection rule (PDR) e.g. with the App-ID, a forwarding action rule (FAR) e.g. including an ordered list of the selected SF-IDs for that UPF, and/or usage reporting rules (URRs) for activating SF load reporting e.g. including the target SF-IDs and reporting triggers (which may, for example, be triggered periodically, upon reaching a threshold, etc.). At block 622 in FIG. 14b, the UPF node 20 generates (or sets) an identifier ("Chain-ID") that identifies one or more of the selected plurality of SFs that the UPF node 20 supports. For example, the UPF node 20 may generate a Chain-ID for an ordered set of SFs.

The method illustrated in FIG. 10 is thus performed in that the UPF node 20 receives, from the SMF node 10, the request to establish the PFCP session with the UPF node 20, i.e. the PFCP session establishment request. The UPF node 20 can then establish the PFCP session using the one or more selected SFs indicated by the request.

For example, in more detail, as illustrated by arrow 624 in FIG. 14b, the UPF node 20 may send to the SFF node 40 a set service chain (SC) message including the Chain-ID and, if applicable, the ordered set of SFs. As illustrated by arrow 626 in FIG. 14b, the UPF node 20 may send to the SMF node 10 a PFCP session establishment response. The PFCP session establishment response may include the Chain-ID. At block 628 in FIG. 14*b*, the PDU session establishment procedure is completed. In some embodiments, once the PDU session is established, the UPF node 20 may forward UP traffic to the SFF node 40, as illustrated by arrow 630 in FIG. 14*b*. The UP traffic may, for example, include the Chain-ID. Then, the SFF node 40 can send the traffic to the proper SFs.

Figure 15:
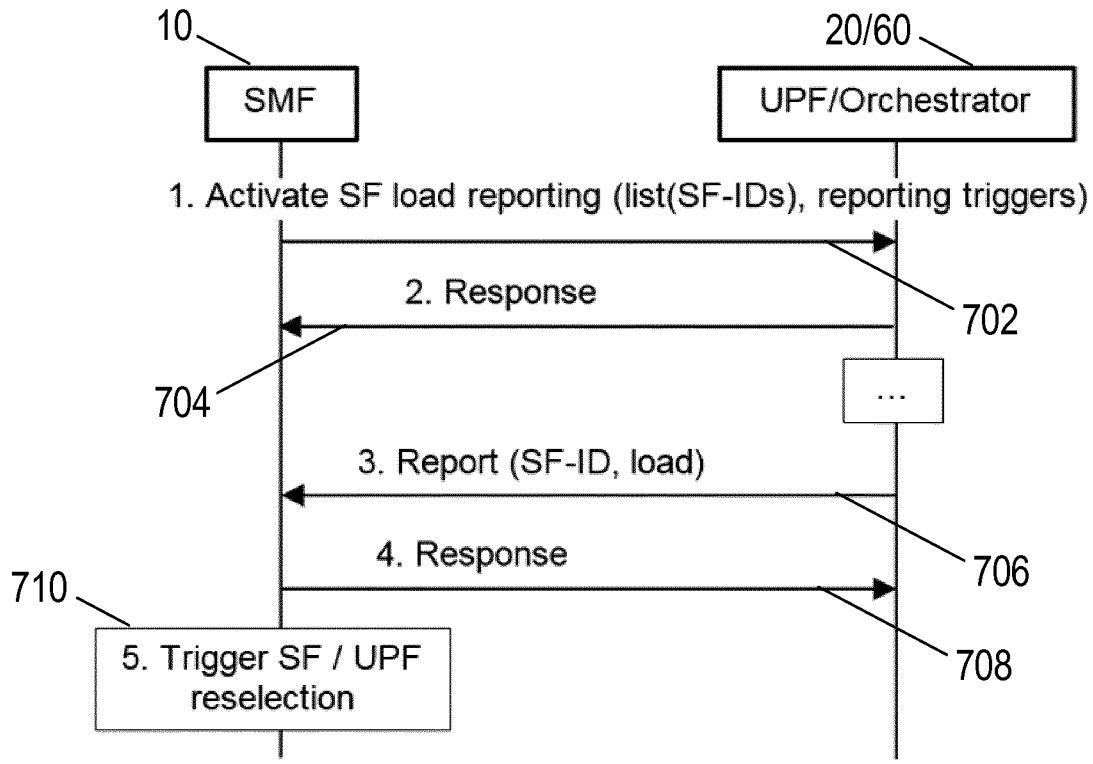
FIG. 15 is a signalling diagram illustrating an exchange of signals according to an embodiment.

FIG. 15 is a signalling (or call flow) diagram illustrating an exchange of signals in an example embodiment. The exchange of signals is in a network. The network comprises an SMF node 10 and a UPF node 20 or an orchestrator node 60. In more detail, FIG. 15 depicts an SMF subscription for SF load reports to the UPF node 20 or the orchestrator node 60.

As illustrated by arrow 702 of FIG. 15, in some embodiments, the SMF node 10 may send to the UPF node 20 or the orchestrator node 60 of the SF a load reporting request, e.g. an activate SF load reporting message. The load reporting request is a request for reports on SF loads. For example, in some embodiments, the SMF node 10 may subscribe to the UPF node 20 or the orchestrator node 60 for SF load reports. The load reporting request may, for example, comprise an indication (e.g. list) of target SFs (such as their SF-IDs) and the reporting triggers per SF (e.g. which may, for example, be triggered periodically, at reaching a threshold, etc.). As illustrated by arrow 704 in FIG. 15, the UPF node 20 or the orchestrator node 60 of the SF may send a response to the SMF node 10 to acknowledge the load reporting request.

As illustrated by arrow 706 of FIG. 15, the UPF node 20 or the orchestrator node 60 of the SF may send a load report to the SMF node 10, e.g. including the SF-ID and SF load. As illustrated by arrow 708 of FIG. 15, the SMF node 10 may send a response to the UPF node 20 or the orchestrator node 60 to acknowledge the load report. As illustrated by arrow 710 of FIG. 15, the SMF node 10 may use the load report to trigger UPF reselection or SF reselection (among UPFs) actions.

Figure 16:
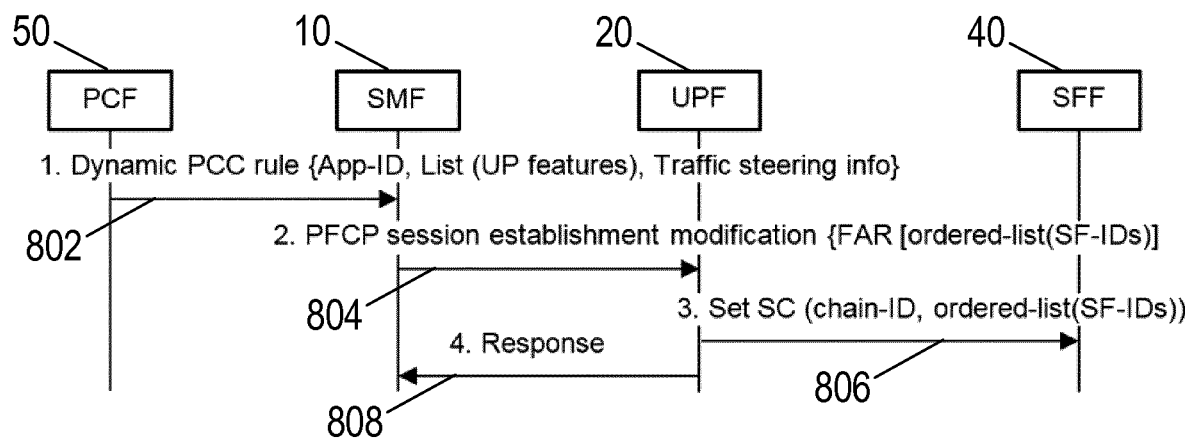
FIG. 16 is a signalling diagram illustrating an exchange of signals according to an embodiment.

FIG. 16 is a signalling (or call flow) diagram illustrating an exchange of signals in an example embodiment. The exchange of signals is in a network. The network comprises an SMF node 10 and a UPF node 20. Also, in this illustrated example embodiment, the network comprises an SFF node 40 and a PCF node 50. In more detail, FIG. 16 depicts an SF chain update triggered by a dynamic PCC rule.

As illustrated by arrow 802 of FIG. 16, in some embodiments, the PCF node 50 may send a (dynamic) PCC rule to the SMF node 10. The PCC rule may, for example, comprise an identifier of an application ("App-ID"), an indication (e.g. a list) of one or more features to activate in the UPF node 20 (such as any of those mentioned earlier), and/or traffic steering information. The one or more features may be one or more user plane (UP) features.

As illustrated by arrow 804 in FIG. 16, the SMF node 10 may send to the UPF node 20 a PFCP session establishment modification request. The PFCP session establishment modification request may comprise a FAR, e.g. with the ordered list of SF-IDs. As illustrated by arrow 806 in FIG. 16, the UPF node 20 may send to the SFF node 40 an update of the SFs linked to the Chain-ID. As illustrated by arrow 806 in FIG. 16, the UPF node 20 may send to the SMF node 10 a PFCP session establishment modification response.

Figure 17:
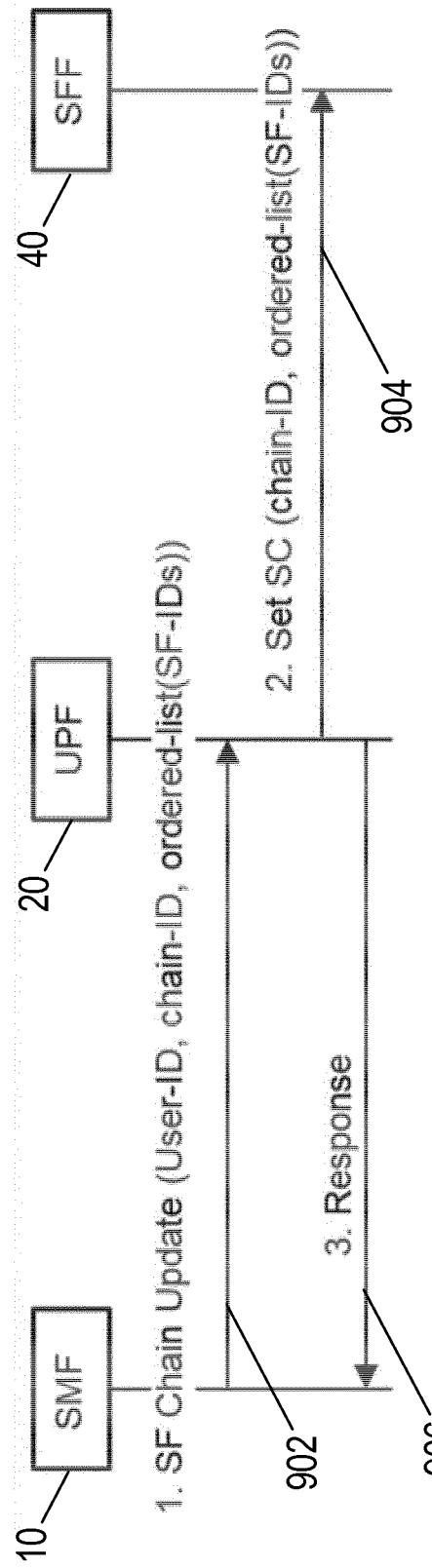
FIG. 17 is a signalling diagram illustrating an exchange of signals according to an embodiment.

FIG. 17 is a signalling (or call flow) diagram illustrating an exchange of signals in an example embodiment. The exchange of signals is in a network. The network comprises an SMF node 10 and a UPF node 20. Also, in this illustrated example embodiment, the network comprises an SFF node 40. In more detail, FIG. 17 depicts a service chain (SC) update triggered by the SMF node 10.

In some embodiments, the SMF node 10 may trigger an SF reselection (e.g. if an SF is becoming overloaded in a UPF node 20, or as a consequence of a dynamic PCC rule updating the features that an SF is capable of activating). As described earlier, for example, the SMF node 10 may reselect a plurality of SFs to connect in a SF chain for handling a PFCP session based on a load of one or more of the selected plurality of SFs and, for each UPF node 20 that supports one or more of the reselected plurality of SFs, the SMF node 10 may initiate transmission of a request to the UPF node to establish the PFCP session with the UPF node.

For example, as illustrated by arrow 902 of FIG. 17, the SMF node 10 may send to the target UPF node 20 a SF chain update message, e.g. including the User-ID, Chain-ID and the updated ordered list of SF-IDs. As illustrated by arrow 904 in FIG. 17, the UPF node 20 may send to the SFF node 40 the ordered list of SF-IDs linked to the Chain-ID. As illustrated by arrow 906 in FIG. 17, the UPF node 20 may respond to the SMF node 10 acknowledging the chain update.

Figure 18:
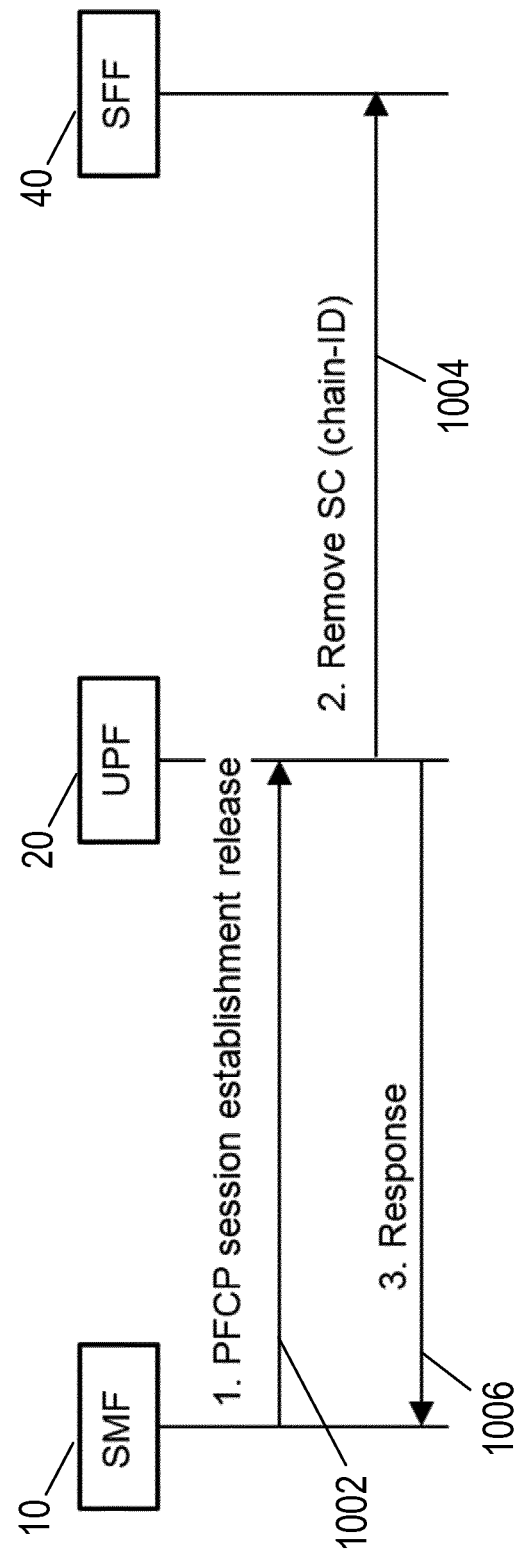
FIG. 18 is a signalling diagram illustrating an exchange of signals according to an embodiment.

FIG. 18 is a signalling (or call flow) diagram illustrating an exchange of signals in an example embodiment. The exchange of signals is in a network. The network comprises an SMF node 10 and a UPF node 20. Also, in this illustrated example embodiment, the network comprises an SFF node 40. In more detail, FIG. 18 depicts a release of a PFCP session and a removal of an associated service chain (SC).

As illustrated by arrow 1002 of FIG. 18, in some embodiments, when a PDU session is released, the SMF node 10 may send to the UPF node 20 a PFCP session establishment release request. As illustrated by arrow 1004 in FIG. 18, the UPF node 20 may send to the SFF node 40 a remove SC message, which may include the Chain-ID. As illustrated by arrow 1006 in FIG. 18, the UPF node 20 may send to the SMF node 10 a PFCP session establishment release response.

Figure 19:
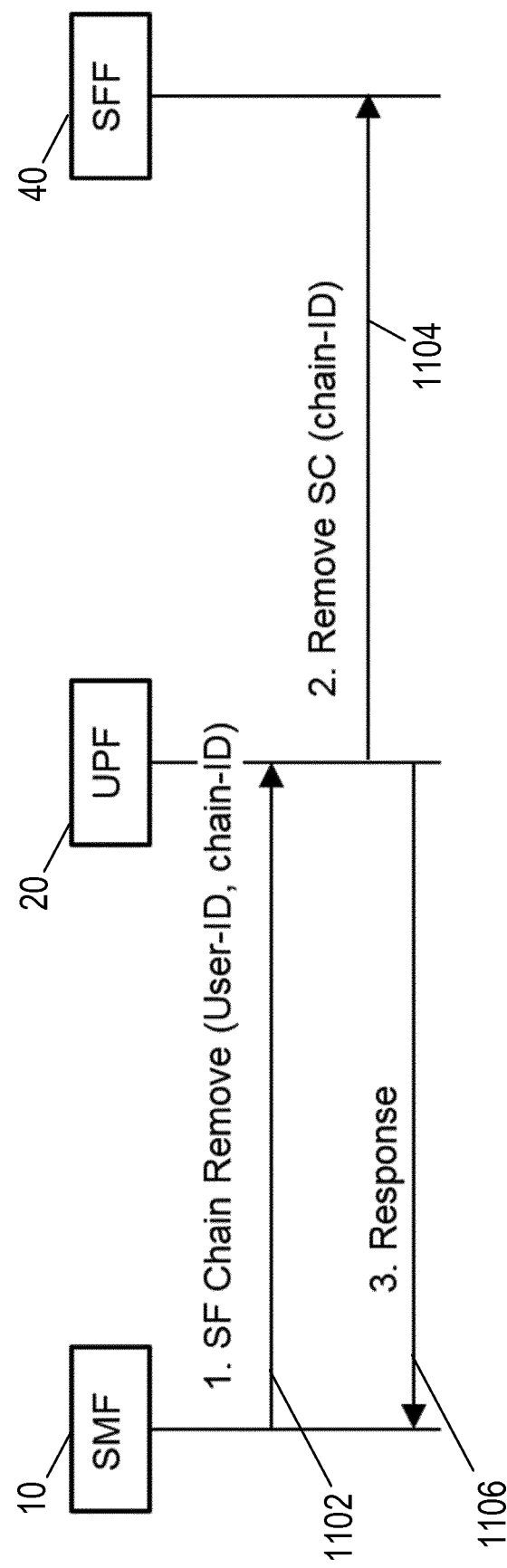
FIG. 19 is a signalling diagram illustrating an exchange of signals according to an embodiment.

FIG. 19 is a signalling (or call flow) diagram illustrating an exchange of signals in an example embodiment. The exchange of signals is in a network. The network comprises an SMF node 10 and a UPF node 20. Also, in this illustrated example embodiment, the network comprises an SFF node 40. In more detail, FIG. 19 depicts a removal of a service function (SF) chain in the UPF node 20 by the SMF node 10.

As illustrated by arrow 1102 of FIG. 19, in some embodiments, if the SMF node 10 decides to not chain any SFs for a specific user in a UPF node 20, the SMF node 10 sends to the UPF node 20 an SF chain remove message, which may comprise the User-ID and Chain-ID. As illustrated by arrow 1104 in FIG. 19, the UPF node 20 may also remove the chain in the SFF node 40 by sending a remove SC message to the SFF node 40, which may comprise the Chain-ID. As illustrated by arrow 1104 in FIG. 19, the UPF node 20 may send a response message to the SMF node 10 acknowledging the chain removal.

Figure 20:
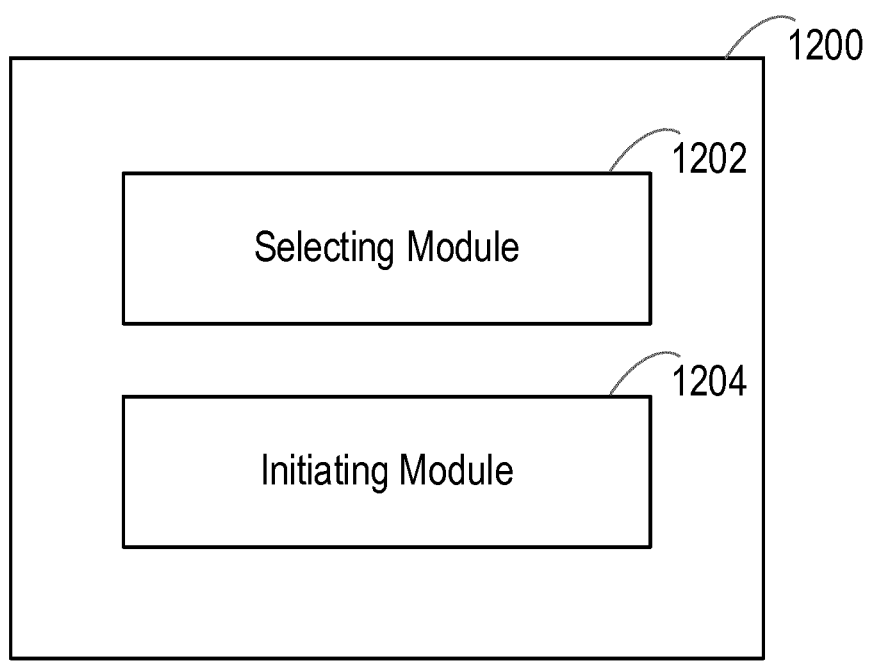
FIG. 20 is a block diagram illustrating a session management function node according to an embodiment.

FIG. 20 is a block diagram illustrating an SMF node 1200 in accordance with an embodiment. The SMF node 1200 comprises a selection module 1202 configured to select a plurality of SFs to connect in an SF chain for handling the PFCP session. Each of the plurality of SFs capable of activating a feature of the PFCP session and is supported by a UPF node. The selection is based on a load of each of the plurality of SFs. The SMF node 1200 comprises an initiating module 1204 configured to, for each UPF node that supports one or more of the selected plurality of SFs, initiate transmission of a request to the UPF node to establish the PFCP session with the UPF node. The request comprises an indication of the one or more of the selected plurality of SFs that the UPF node supports. The SMF node 1200 may operate in the manner described herein.

Figure 21:
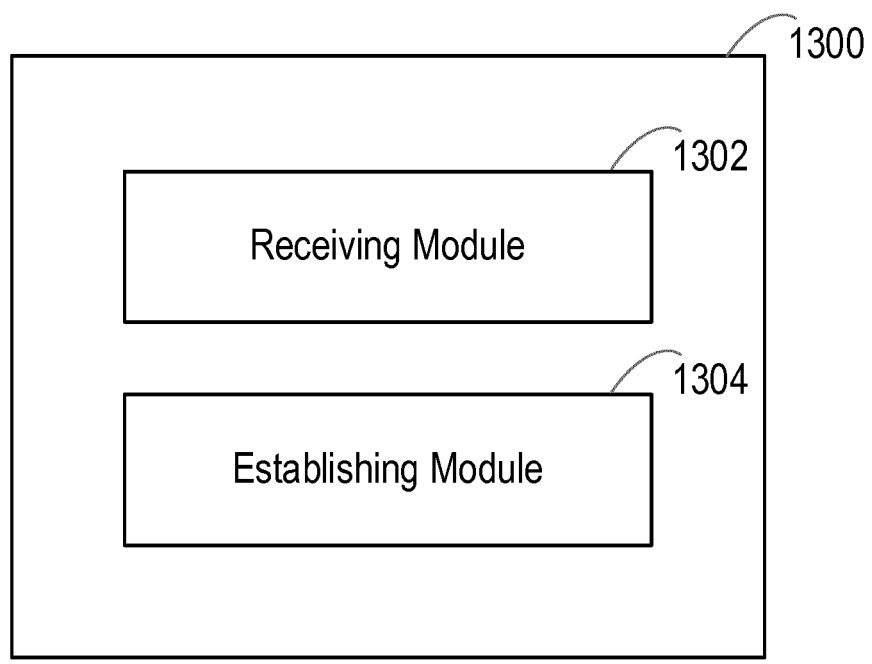
FIG. 21 is a block diagram illustrating a user plane function node according to an embodiment.

FIG. 21 is a block diagram illustrating a UPF node 1300 in accordance with an embodiment. The UPF node 1300 comprises a receiving module 1302 configured to receive, from an SMF node 1200, a request to establish the PFCP session with the UPF node 1300. The request comprises an indication of one or more selected SFs supported by the UPF node 1300 and capable of activating a feature of the PFCP session. The one or more selected SFs are selected based on their load and are connected in an SF chain for handling the PFCP session. The UPF node 1300 comprises an establishing module 1304 configured to establish the PFCP session using the one or more selected SFs. The UPF node 1300 may operate in the manner described herein.

There is also a system, which can comprise at least one SMF node 10, 1200 as described herein and at least one UPF node 20, 1300 as described herein.

There is also a computer program comprising instructions which, when executed by processing circuitry (such as the processing circuitry 12 of the SMF node 10 and/or the processing circuitry 22 of the UPF node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the SMF node 10 and/or the processing circuitry 22 of the UPF node 20 described earlier) to cause the processing circuitry to perform at least part of the method described herein. There is provided a computer program product comprising a carrier containing instructions for causing processing circuitry (such as the processing circuitry 12 of the SMF node 10 and/or the processing circuitry 22 of the UPF node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

The node functionality described herein can be performed by hardware. Thus, any one or more nodes described herein can be a hardware node. However, it will also be understood that at least part or all of the node functionality described herein can be virtualized. For example, the functions performed by any one or more nodes can be implemented in software running on generic hardware that is configured to orchestrate the node functionality. Thus, in some embodiments, any one or more nodes described herein can be a virtual node. In some embodiments, at least part or all of the node functionality described herein may be performed in a network enabled cloud. The node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided an improved technique for establishing a PFCP session.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a session management function node of a network for establishing a packet forwarding control protocol session, the method comprising:
   selecting a plurality of service functions to connect in a service function chain for handling the packet forwarding control protocol session, each of the plurality of service functions being capable of activating a feature of the packet forwarding control protocol session and being supported by at least one user plane function node, the selection being based at least in part on a load of each of the plurality of service functions and on a location of each user plane function node of the at least one user plane function node that supports one or more of the plurality of service functions; and
   for each user plane function node of the at least one user plane function node that supports one or more of the selected plurality of service functions, initiating transmission of a request to the user plane function node to establish the packet forwarding control protocol session with the user plane function node, the request comprising an indication of the one or more of the selected plurality of service functions that the user plane function node supports.

2. The method as claimed in claim 1, the method comprising:
   selecting the plurality of service functions in response to a determination that a plurality of user plane function nodes are required for handling the packet forwarding control protocol session.

3. The method as claimed in claim 1, wherein:
   each of the selected plurality of service functions is supported by a user plane function node that is located at a predefined location.

4. The method as claimed in claim 1, the method comprising:
   for each user plane function node of the at least one user plane function node that supports one or more of the selected plurality of service functions, receiving an identifier that identifies one or more of the selected plurality of service functions that the user plane function node supports.

5. The method as claimed in claim 1, the method comprising:
   reselecting a plurality of service functions to connect in the service function chain for handling the packet forwarding control protocol session based at least in part on a load of one or more of the reselected plurality of service functions and on a location of each user plane function node of the at least one user plane function node that supports one or more of the plurality of reselected service functions; and
   for each user plane function node of the at least one user plane function node that supports one or more of the reselected plurality of service functions, initiating transmission of a request to the user plane function node to establish the packet forwarding control protocol session with the user plane function node, the request comprising an indication of the one or more of the reselected plurality of service functions that the user plane function node supports.

6. The method as claimed in claim 1, the method comprising:
receiving, from a user plane function node of the at least one user plane function node that supports one or more of the selected plurality of service functions, an indication that at least one service function supported by the user plane function node is unavailable; and
updating the selection of the plurality of service functions to connect in the service function chain for handling the packet forwarding control protocol session based on the indication.

7. A session management function node comprising:
processing circuitry; and
at least one memory for storing instructions which, when executed by the processing circuitry, cause the session management function node to:
select a plurality of service functions to connect in a service function chain for handling a packet forwarding control protocol session, each of the plurality of service functions being capable of activating a feature of the packet forwarding control protocol session and being supported by at least one user plane function node, the selection being based at least in part on a load of each of the plurality of service functions and on a location of each user plane function node of the at least one user plane function node that supports one or more of the plurality of service functions; and
for each user plane function node of the at least one user plane function node that supports one or more of the selected plurality of service functions, initiate transmission of a request to the user plane function node to establish the packet forwarding control protocol session with the user plane function node, the request comprising an indication of the one or more of the selected plurality of service functions that the user plane function node supports.

8. A method performed by a user plane function node of a network for establishing a packet forwarding control protocol session, the method comprising:
receiving, from a session management function node, a request to establish the packet forwarding control protocol session with the user plane function node, the request comprising an indication of one or more selected service functions supported by the user plane function node and capable of activating a feature of the packet forwarding control protocol session, the one or more selected service functions being selected based at least in part on their load and on a location of each user plane function node of at least one user plane function node that supports one or more of the one or more selected service functions, the one or more selected service functions being connected in a service function chain for handling the packet forwarding control protocol session; and
establishing the packet forwarding control protocol session using the one or more selected service functions.

9. The method as claimed in claim 8, wherein establishing the packet forwarding control protocol session using the one or more selected service functions comprises:
generating an identifier to identify the one or more selected service functions.

10. The method as claimed in claim 9, wherein establishing the packet forwarding control protocol session using the one or more selected service functions comprises at least one of:
initiating transmission of the identifier and the one or more selected service functions to a service function forwarder node; or
initiating transmission of the identifier and user plane traffic to the service function forwarder node for the service function forwarder node to forward the traffic to the one or more selected service functions identified by the identifier.

11. The method as claimed in claim 9, the method comprising:
initiating transmission of the identifier to the session management function node.

12. A user plane function node comprising:
processing circuitry; and
at least one memory for storing instructions which, when executed by the processing circuitry, cause the user plane function node to:
receive, from a session management function node, a request to establish a packet forwarding control protocol session with the user plane function node, the request comprising an indication of one or more selected service functions supported by the user plane function node and capable of activating a feature of the packet forwarding control protocol session, the one or more selected service functions being selected based at least in part on their load and on a location of each user plane function node of at least one user plane function node that supports one or more of the one or more selected service functions, the one or more selected service functions being connected in a service function chain for handling the packet forwarding control protocol session; and
establish the packet forwarding control protocol session using the one or more selected service functions.

* * * * *